US012784361B1

(12) United States Patent
Rethage et al.

(10) Patent No.: US 12,784,361 B1
(45) Date of Patent: Nov. 3, 2026

(54) SYSTEMS AND METHODS FOR IMAGE RECONSTRUCTION

(71) Applicant: Hover Inc., San Francisco, CA (US)

(72) Inventors: Dario Rethage, Kendall Park, NJ (US); Zhiyao Xiong, San Mateo, CA (US); Domenico Curro, San Francisco, CA (US); Panfeng Li, San Francisco, CA (US); Michael Eschweiler Rivlin, Palo Alto, CA (US)

(73) Assignee: Hover Inc., San Francisco, CA (US)

( * ) Notice: Subject to any disclaimer, the term of this patent is extended or adjusted under 35 U.S.C. 154(b) by 115 days.

(21) Appl. No.: 18/991,238

(22) Filed: Dec. 20, 2024

Related U.S. Application Data

(63) Continuation of application No. 18/519,960, filed on Nov. 27, 2023, now abandoned, which is a
(Continued)

(51) Int. Cl.
*G06T 17/10* (2006.01)
*G06F 18/22* (2023.01)
(Continued)

(52) U.S. Cl.
CPC .............. *G06T 17/10* (2013.01); *G06F 18/22* (2023.01); *G06N 3/08* (2013.01); *G06V 10/462* (2022.01);
(Continued)

(58) Field of Classification Search
CPC ..... G06T 17/10; G06T 2210/12; G06F 18/22; G06N 3/08; G06V 10/462; G06V 20/176
See application file for complete search history.

(56) References Cited

U.S. PATENT DOCUMENTS 11,282,180 B1 3/2022 Saxena et al.
11,445,232 B2 9/2022 Browy et al.
(Continued)

FOREIGN PATENT DOCUMENTS

CN 108205655 A 6/2018
EP 3493104 A1 6/2019
(Continued)

OTHER PUBLICATIONS

Chen, W., Ling, H., Gao, J., Smith, E., Lehtinen, J., Jacobson, A., & Fidler, S. (2019). Learning to predict 3d objects with an interpolation-based differentiable renderer. Advances in neural information processing systems, 32.*
(Continued)

*Primary Examiner* — Sarah Lhymn
(74) *Attorney, Agent, or Firm* — Kilpatrick Townsend & Stockton LLP

(57) ABSTRACT

The present disclosure describes systems and methods for generating three-dimensional (3D) models of structures in two-dimensional (2D) images using machine-learning and/or artificial-intelligence models. A 3D geometry, pose, and orientation of a physical structure can be predicted from a 2D input image. Models detect visible keypoints and predict the locations of non-visible keypoints within a 2D image and execute machine-learning techniques to predict a 3D model that fits the visible and non-visible keypoints. Parameterized shapes for the 2D images may be deformed based on the models output through an optimization solver, or by predicted parameters.

31 Claims, 12 Drawing Sheets

100

Related U.S. Application Data continuation of application No. 17/971,974, filed on Oct. 24, 2022, now abandoned, which is a continuation of application No. 17/371,542, filed on Jul. 9, 2021.

(60) Provisional application No. 63/219,335, filed on Jul. 7, 2021, provisional application No. 63/142,802, filed on Jan. 28, 2021, provisional application No. 63/140,716, filed on Jan. 22, 2021, provisional application No. 63/049,799, filed on Jul. 9, 2020.

(51) Int. Cl.
*G06N 3/08* (2023.01)
*G06V 10/46* (2022.01)
*G06V 20/10* (2022.01)

(52) U.S. Cl.
CPC ........ *G06V 20/176* (2022.01); *G06T 2210/12* (2013.01)

(56) References Cited

U.S. PATENT DOCUMENTS

2010/0201682 A1 8/2010 Quan et al.
2015/0269438 A1 9/2015 Samarasekera et al.
2017/0154204 A1 6/2017 Ryu et al.
2018/0137642 A1* 5/2018 Malisiewicz ..... G06F 18/24133
2018/0137647 A1 5/2018 Li et al.
2018/0255290 A1 9/2018 Holzer et al.
2018/0268220 A1 9/2018 Lee et al.
2019/0147221 A1* 5/2019 Grabner .................... G06T 7/75 382/103
2019/0172223 A1* 6/2019 Vajda .................. G06F 18/2113
2019/0172224 A1 6/2019 Vajda et al.
2020/0151572 A1 5/2020 Gurumurthi
2020/0273177 A1 8/2020 Chen et al.
2020/0320747 A1 10/2020 Izumi
2020/0394413 A1 12/2020 Bhanu et al.
2020/0401617 A1 12/2020 Spiegel et al.
2021/0027083 A1 1/2021 Cohen et al.
2021/0150252 A1 5/2021 Sarlin et al.
2021/0150679 A1 5/2021 Roulet et al.
2021/0183097 A1 6/2021 Georgakis et al.
2021/0241015 A1 8/2021 Song et al.
2021/0315485 A1 10/2021 Matusik et al.
2021/0357630 A1 11/2021 Shaevitz et al.
2022/0262023 A1 8/2022 Vignard et al.
2022/0292717 A1 9/2022 Tan et al.
2023/0217001 A1 7/2023 Holzer et al.
2026/0087658 A1* 3/2026 Huang ...................... G06T 7/50
2026/0120402 A1* 4/2026 Chalasani ................. G06T 7/70

FOREIGN PATENT DOCUMENTS

WO 2019232894 A1 12/2019
WO 2021152547 A1 8/2021

OTHER PUBLICATIONS

Suwajanakorn, S., Snavely, N., Tompson, J., & Norouzi, M. (2018). Discovery of latent 3d keypoints via end-to-end geometric reasoning. Advances in neural information processing systems, 31. 32.*

U.S. Appl. No. 17/371,548, "Non-Final Office Action", Apr. 29, 2025, 28 pages.

U.S. Appl. No. 17/371,542, "Notice of Allowance", Jul. 25, 2022, 11 pages.

U.S. Appl. No. 17/371,548, "Final Office Action", Dec. 3, 2024, 23 pages.

U.S. Appl. No. 17/371,548, "Final Office Action", Sep. 19, 2023, 20 pages.

U.S. Appl. No. 17/371,548, "Non-Final Office Action", Apr. 27, 2023, 18 pages.

U.S. Appl. No. 17/371,548, "Non-Final Office Action", Jun. 20, 2024, 20 pages.

U.S. Appl. No. 17/971,974, "Notice of Allowance", Aug. 28, 2023, 10 pages.

U.S. Appl. No. 18/519,960, "Notice of Allowance", Sep. 26, 2024, 10 pages.

Kong, et al., "HyperNet: Towards Accurate Region Proposal Generation and Joint Object Detection", Proceedings of the IEEE Conference on Computer Vision and Pattern Recognition, Apr. 3, 2016, pp. 845-853.

Ku, et al., "Joint 3D Proposal Generation and Object Detection from View Aggregation", IEEE/RSJ International Conference on Intelligent Robots and Systems, Jul. 12, 2018, 8 pages.

Li, et al., "Factorizable Net: An Efficient Subgraph-Based Framework for Scene Graph Generation", Proceedings of the European Conference on Computer Vision (ECCV), 2018, pp. 1-17.

Reddy, et al., "Occlusion-Net: 2D/3D Occluded Keypoint Localization Using Graph Networks", Institute of Electrical and Electronics Engineers / Climate Vulnerable Forum Conference on Computer Vision and Pattern Recognition (CVPR), Jun. 15-20, 2019, pp. 7326-7335.

* cited by examiner

300

400

500

700

800

900

1000

1100

SYSTEMS AND METHODS FOR IMAGE RECONSTRUCTION

CROSS-REFERENCE TO RELATED APPLICATIONS

This application is a continuation of U.S. application Ser. No. 18/519,960, filed on Nov. 27, 2023, which is a continuation of U.S. application Ser. No. 17/971,974, filed on Oct. 24, 2022, which is a continuation of U.S. application Ser. No. 17/371,542, filed on Jul. 9, 2021, which claims the benefit of and priority to U.S. Provisional Application No. 63/049,799, filed on Jul. 9, 2020, 63/140,716, filed on Jan. 22, 2021, 63/142,802 filed on Jan. 28, 2021, and 63/219,335, filed on Jul. 7, 2021, all of which are hereby incorporated by reference in their entireties.

TECHNICAL FIELD

The present disclosure relates to systems and methods for executing trained machine-learning models to generate a prediction of a three-dimensional (3D) model of a physical structure detected within a two-dimensional (2D) image (e.g., a photograph). More particularly, the present disclosure relates to a machine-learning model trained to predict the 3D parameters (e.g., 3D shape, 3D orientation, 3D pose, etc.) of a physical structure (or substructure) based on inferred structural intersections (e.g., keypoints) or structural lines detected in a 2D image of the physical structure.

BACKGROUND

A physical structure (e.g., a house) can be represented as a digital 3D model using executable code (e.g., a specialized software tool). A 3D model of a physical structure can include data that represents a complex combination of structural features. Modeling a physical structure, however, often involves the use of a professional to create designs in three dimensions that reflect the features of the physical structure. Thus, there is generally a significant time delay in generating a 3D model due to the burdensome process.

BRIEF SUMMARY

Certain aspects and features of the present disclosure relate to predicting 3D parameters of a physical structure depicted in a 2D input image. In some implementations, an end-to-end model may be trained to analyze a 2D image of a physical structure and generate a prediction of a 3D model of the physical structure. Predicting the 3D model of a physical structure may include inferring the locations of visible and non-visible keypoints within a 2D image of the physical structure and estimating whether the keypoints should be visible or non-visible and adjusting the positions of non-visible keypoints based on the position of visible keypoints. For example, a keypoint represents a structural intersection of a physical structure (e.g., a front apex of a roof).

In some examples, the keypoints may be mapped to a statistically average 3D shape (e.g., a known primitive). The statistically average 3D shape may be predefined or derived from the average of primitives as detected within the training data. The statistically average 3D shape may be deformed to fit the visible and non-visible keypoints within the 2D image. In some examples, the keypoints may be used for predicting a 3D shape (shape parameter) of a substructure, a 3D orientation (orientation parameter) of the substructure, and 3D distance (distance parameter) of the substructure. In some examples, one or more or all of the 3D shape parameter, the 3D orientation parameter, and the 3D distance parameter may be determined independently of one another. In some examples, however, two or more of these may be determined in concert with and/or used for validating one another.

The mapping, deforming, shape parameter determination, and/or orientation parameter determination may be performed using a combination of a trained 2D graph neural network model (hereinafter referred to as "2D graph model") and a trained 3D graph neural network model (hereinafter referred to as "3D graph model"). The 3D distance parameter determination may be performed using a feedforward neural network model (hereinafter referred to as a "feedforward distance determination model"). In some examples, the deformed version of the statistically average 3D shape, the 3D shape parameter, 3D orientation parameter, and/or the 3D distance parameter may be applied to the 2D image data to reflect the prediction of the 3D model of the physical structure, such as by projecting keypoints determined for a 2D graph layer and/or equivalent keypoints for a 3D graph layer over the image of the physical structure.

A graph layer can be represented by nodes and edges. For application to a physical structure, for example, every node in the 2D graph layer can correspond to a given keypoint and be connected to every other node in the 2D graph layer; edges may correspond to vectors between the nodes. A 3D graph model can operate similarly, but in a 3D domain instead of a 2D domain. Keypoint detection may employ a series of channels or layers, each channel configured or trained to identify a particular keypoint among given keypoints. Keypoints visible in an image will have a strong correlation within a channel for the given keypoint, such as discrete localization by an argmax function, or small distribution on a heatmap, or both. Keypoint channels without a given keypoint observable in the image will randomly place the predicted keypoint or provide wide gaussian distribution on localization. An encoder component may receive the keypoint channel outputs and identify which of the received keypoints associate or map to a given structural arrangement; as keypoints with random or severe distribution in predicted location will not statistically conform or map to given structural arrangements (such as a gable), such keypoints may be deemed non-visible or occluded. A decoder network may then adjust the occluded keypoint locations based on the location(s) of the visible keypoints and the given structural arrangement.

The graph models can learn a mapping based on the configuration of keypoints for associated visibility predictions. This is a constraint-free approach to structural prediction, as structures may be generated without satisfying discernible criteria from the image. In other words, the lack of certain features or keypoints will not preclude a structural prediction. In some embodiments, the predicted locations of occluded keypoints may be used as constraints for a separate pipeline in structure prediction that requires information of certain features in order to build geometry.

To illustrate and only as a non-limiting example, generating a prediction of the 3D model of a house includes executing the end-to-end model to detect pixels of a 2D image that depict the house. The presence of a gable (e.g., a substructure of the house) within the pixels depicting the house may then be inferred. The dimensions of a bounding box surrounding the inferred gable may be predicted. The presence of the gable may be validated by extracting a feature map from the image as defined by the bounding box.

The feature map may correspond to locations for a set of structural intersections of the substructure visible in the 2D image, which may be converted to keypoints in the 2D graph model. For example, the feature map may identify visible intersections or corners of the substructure in the 2D image and may comprise x,y pixel coordinates for the features.

The feature map may be inputted into a 2D graph model trained to predict the positions and visibility of a set of keypoints, used to define a substructure (e.g., a gable), such as 14 keypoints including 8 corners of a cuboid base and 2 apexes (e.g., front and back) and 4 corners (e.g., eave/rake intersections) of an angled roof. In some cases, the features in the feature map may be directly transformable into certain keypoints, such as keypoints that are directly and unambiguously visible in the image. The 2D graph model may predict the location of keypoints or features visible in the 2D image as well as non-visible keypoints that are not visible within the 2D image. A 2D visibility model may be generated to represent the predicted visibility of any one keypoint (either an extracted visible keypoint or a predicted non-visible keypoint). The 2D graph model may predict the locations of non-visible points (e.g., in a 2D image space) based on patterns of 2D points in the image space learned during training. Each instance of a feature map within a bounding box is inputted into the 2D graph model, and a 2D visibility model (e.g., visibility scores for each keypoint) is generated specific to the set of keypoints derived therefrom.

The 2D visibility model, such as with the set of keypoints, may be inputted into a 3D graph model trained to predict or generate parameters for a 3D model in a 3D domain. In some examples, the 3D graph model may be trained to deform a statistically average 3D gable (e.g., a known primitive of the gable) to predict a fit to the visible and non-visible keypoints in the bounding box. The 3D model of the entire house can be predicted based on a combination of the 3D parameters of each substructure detected within the pixels depicting the house.

In some examples, the 3D graph model may be trained to generate a shape for a 3D model in a 3D domain and an orientation for the 3D model in the 3D domain using the keypoint positions and visibilities obtained from the 2D graph model. For example, the shape and orientation may define the predicted locations in the 3D domain for the keypoints relative to a specific viewpoint (e.g., a camera position) so as to align the 3D model with the camera pose from the 2D image. The predicted shape and orientations may be based on patterns of shapes and orientations in the 3D domain learned during training. In some examples, the training process can perform analysis of the shapes and orientations for sets of training data (e.g., keypoints and visibilities) for known 3D geometries independently, as these parameters can, in some cases, influence one another if trained at the same time. For example, the training process can use a fixed orientation for learning patterns associated with the shape parameter, and compare with the actual 3D geometries in a parameterized fashion or using another comparison process, such as where the predicted 3D structure is compared with the known 3D structure by converting the predicted 3D structure for the fixed orientation and predicted shape to a 2D projections and comparing with a 2D projection for the known 3D shape on a pixel-by-pixel basis. Similarly, the training process can use a fixed shape for learning patterns associated with the orientation parameter, and compare with the actual 3D geometries in a parameterized fashion or using another comparison process, such as where the predicted 3D structure is compared with the known 3D structure by converting the predicted 3D structure for the fixed shape and predicted orientation to a 2D projections and comparing with a 2D projection for the known 3D shape on a pixel-by-pixel basis, for example.

In some examples, using a predicted shape and orientation may leave out one other aspect defining the characteristics of a 3D model—a distance or size parameter. It will be appreciated that in a 3D rendering, objects with the same shape, orientation, and size will appear relatively smaller or larger depending on the distances from the camera or viewpoint. Similarly, in a 3D rendering, objects with the same shape and orientation, but different sizes and at different distances from the camera or viewpoint can appear to be the same. In some implementations, the feature map and/or the 2D image can be inputted into a feedforward neural network, such as a multi-layer perceptron model, for evaluating and predicting the distance parameter associated with the substructure. The model can use known and predictive structural features to evaluate distance characteristics, such as recognizing a door in a structure and that such a door may have a standardized height (e.g., equal to or about 80 inches or equal to or about 2 meters), and/or recognizing a wall in a structure or substructure and that such a wall may have a standardized height (e.g., equal to or about 8 feet, or 9 feet, or 10 feet), and basing distance estimations around such standardized values.

In some implementations, a solver network can be configured to execute deep-learning models trained to individually predict image features, 2D keypoint(s), and 3D structure(s) using a solver protocol. For example, the solver network may be trained to predict the 3D parameters of a substructure (e.g., a gable) of a physical structure (e.g., a house) based on the classification of features and lines detected within pixels of a 2D image of the physical structure. The solver network may include a neural network (e.g., a MaskRCNN) trained to classify lines and/or features of a physical structure depicted within pixels of a 2D image. For example, a first neural network may be trained to classify pixels as a fascia line of a roof of a house and a second neural network may be trained to classify pixels as a hip line of the roof of the house, and so on. Alternatively, a single neural network may be trained to detect and classify several different types of structural lines and features. In some implementations, a single neural network may detect a particular shape, such as a 2D gable defined by classified structural lines, and the features of that shape. In other implementations, a neural network may be trained to detect the 2D shape (e.g., the gable) and a separate neural network may be trained to detect the features within the 2D image. After the lines and keypoints of the physical structure have been classified, a substructure, such as a gable, can be detected. For example, a gable can be defined using the classified fascia lines, the classified roof ridgeline, and two classified rake lines. The solver network may parameterize a deformable 3D gable shape (e.g., a known gable primitive in a 3D space) or parameterize the 3D model by shape and orientation to fit the classified lines that define a 2D gable in the 2D image. Parameterizing the deformable 3D gable shape may include executing a solver protocol to predict the deformation of the deformable 3D gable that would fit the classified lines that define the 2D gable, or to predict the shape and orientation of a 3D gable that would fit the keypoints and their visibility. A solver protocol or a 3D graph model may be used to parameterize the deformable 3D gable shape.

As a non-limiting example, the solver network may be configured to execute a non-linear non-convex optimization solver protocol (e.g., algorithm) to determine the minimum of a given function. The determined minimum may be used to generate the deformation parameters for deforming the deformable 3D gable shape to fit the classified structural lines or keypoints of the 2D gable (or other classified structure) in the 2D image. The present application is not limited to the solver network executing the non-linear non-convex optimization solver. Other solver protocols may be used in implementations herein, such as, for example, gradient descent methods (e.g., Newton-Gaussian method), the BFGS protocol, (Broyden-Fletcher-Goldfarb-Shanno), random-based solver (e.g., simulated-annealing), and other suitable solvers. In some examples, the solver protocol may be configured to increase a penalty function when the 3D gable does not agree with the 2D keypoint detection. The minimum penalty generated by the penalty function may be reached when the 3D parameters of the 3D gable matches with the 2D keypoint or structural line prediction.

To illustrate and only as a non-limiting example, a 2D image of a house is captured using any digital camera. The 2D image is inputted into an object detection network or region proposal model. The object detection network or region proposal model may include a trained machine-learning model that can simultaneously or successively generate a bounding box surrounding pixels inferred to depict a gable (e.g., or any other substructure) of the house in the 2D image and detect a set of features within the bounding box. A validation process for validating that the bounding box contains pixels of the gable may or may not be performed. The structural lines or features within a bounding box may be classified (e.g., a fascia line may be classified as such). The classified lines and features may define or indicate the shape of a 2D gable, at least in part, and be used by a 3D graph model to extract 2D parameters, such as keypoints and visibility scores for the keypoints. The 3D parameters of the 2D gable may be predicted using a 3D graph model (described above) or using a solver protocol. For example, the 3D parameters may be defined after performing the solver protocol, which optimizes by deforming a statistically average gable to fit the classified lines and keypoints in the 2D image. As another example, the 3D parameters may be defined using a 3D graph model that predicts shape and orientation parameters for a cuboid base and an angled roof to fit the classified lines and keypoints extracted from the 2D image, and combines with a distance parameter separately evaluated using another machine learning model.

Generating a 3D model of a physical structure depicted in a captured 2D image using the end-to-end model or using the solver network, described in various implementations above and herein, avoids the need for professionals to design the 3D model of a physical structure and reduces the time delay in generating a 3D model from a 2D image. For example, the 3D model may be suitable for enabling users to visualize proposed improvements to a house or to improve the speed of the digital modeling process.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including receiving a two-dimensional (2D) image. The computer-implemented method may also include detecting, from the 2D image, a set of pixels representing a physical structure. The computer-implemented method may also include predicting, using a region proposal model, a presence of a substructure within the set of pixels, the region proposal model predicting that the substructure is located within a subset of the set of pixels of the 2D image. The computer-implemented method may also include generating a substructure bounding box configured to include the subset of pixels associated with the predicted substructure. The computer-implemented method may also include extracting a set of keypoints from the subset of pixels included within the substructure bounding box, each keypoint of the set of keypoints corresponding to a structural intersection of the substructure. The computer-implemented method may also include generating a 2D visibility model by inputting the set of keypoints into a trained 2D graph model, the 2D visibility model inferring a visibility of each keypoint of the set of keypoints within the subset of pixels associated with the substructure. The computer-implemented method may also include predicting one or more 3D parameters of the substructure within a 3D domain by inputting the 2D visibility model into a 3D graph model trained to map visible keypoints of 2D images to 3D points in the 3D domain, the 3D graph model generating a deformation parameter for deforming a statistically average 3D shape to fit the set of keypoints associated with the substructure, and the one or more 3D parameters of the substructure being predicted by deforming the statistically average 3D domain using the deformation parameter. The computer-implemented method may also include generating, based on the predicted one or more 3D parameters of the substructure, a prediction of a 3D model of the physical structure detected in the 2D image. Other embodiments of this aspect include corresponding computer systems, apparatus, and computer programs recorded on one or more computer storage devices, each configured to perform the actions of the methods.

Another general aspect includes a computer-implemented method, including receiving a two-dimensional (2D) image. The computer-implemented method may also include detecting, from the 2D image, a set of pixels representing a physical structure. The computer-implemented method may also include predicting, using a region proposal model, a bounding box within the set of pixels and a feature map. In some examples, the region proposal model is trained to predict a presence of a substructure within a subset of pixels of the set of pixels, generate the bounding box configured to include the subset of pixels associated with the substructure; and identify the feature map using the 2D image and the bounding box. Optionally, the region proposal model is a neural network trained to generate an anchor point, a width, and a height of the bounding box to surround a predicted location of the substructure. In some examples, the feature map corresponds to locations for a set of structural intersections of the substructure visible in the 2D image as limited by the bounding box.

The computer-implemented method may also include generating parameters for a 3D model of the substructure in a 2D domain by inputting the feature map into a trained 2D graph model. In some examples, the parameters for the model include a set of keypoints and visibility scores for each keypoint of the set of keypoints. In some examples, the trained 2D graph model is trained to assign 2D positions for each keypoint of the set of keypoints based on the feature map, determine the visibility score for each keypoint of the set of keypoints using the 2D image and the bounding box, the visibility score indicating a degree to which keypoints of the set of keypoints are estimated as occluded or unoccluded, and adjust 2D positions of occluded keypoints of the set of keypoints based on 2D positions of unoccluded keypoints of the set of keypoints.

The computer-implemented method also include predicting parameters for a three-dimensional (3D) model of the substructure by inputting the parameters for the model generated by the trained 3D graph model into a trained 3D graph model. In some examples, the trained 3D graph model is trained to map keypoints of the parameters for the model to 3D points in a 3D domain, wherein the parameters for the 3D model include a substructure shape parameter and a substructure orientation parameter defining the 3D points in the 3D domain. Optionally, the trained 3D graph model is trained by evaluating a substructure shape parameter for a known substructure orientation for a test substructure, and evaluating a substructure orientation parameter for a known substructure shape for the test substructure. Optionally, the trained 3D graph model is trained by reconciling the substructure shape parameter and the substructure orientation parameter for the test substructure to agree with one another.

The computer-implemented method may also include predicting a substructure distance parameter by inputting the feature map into a feedforward distance determination model. The computer-implemented method may also include generating, using the parameters for the 3D model of the substructure and the substructure distance parameter, a prediction of a 3D model of the physical structure detected in the 2D image. Other embodiments of this aspect include corresponding computer systems, apparatus, and computer programs recorded on one or more computer storage devices, each configured to perform the actions of the methods.

In some embodiments, a system is provided that includes one or more data processors and a non-transitory computer readable storage medium containing instructions that, when executed on the one or more data processors, cause the one or more data processors to perform part or all of one or more methods disclosed herein.

In some embodiments, a computer-program product is provided that is tangibly embodied in a non-transitory machine-readable storage medium and includes instructions that, when executed by one or more data processors, cause the one or more data processors to perform part or all of one or more methods disclosed herein.

Some embodiments of the present disclosure include a system including one or more data processors. In some embodiments, the system includes a non-transitory computer readable storage medium containing instructions that, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
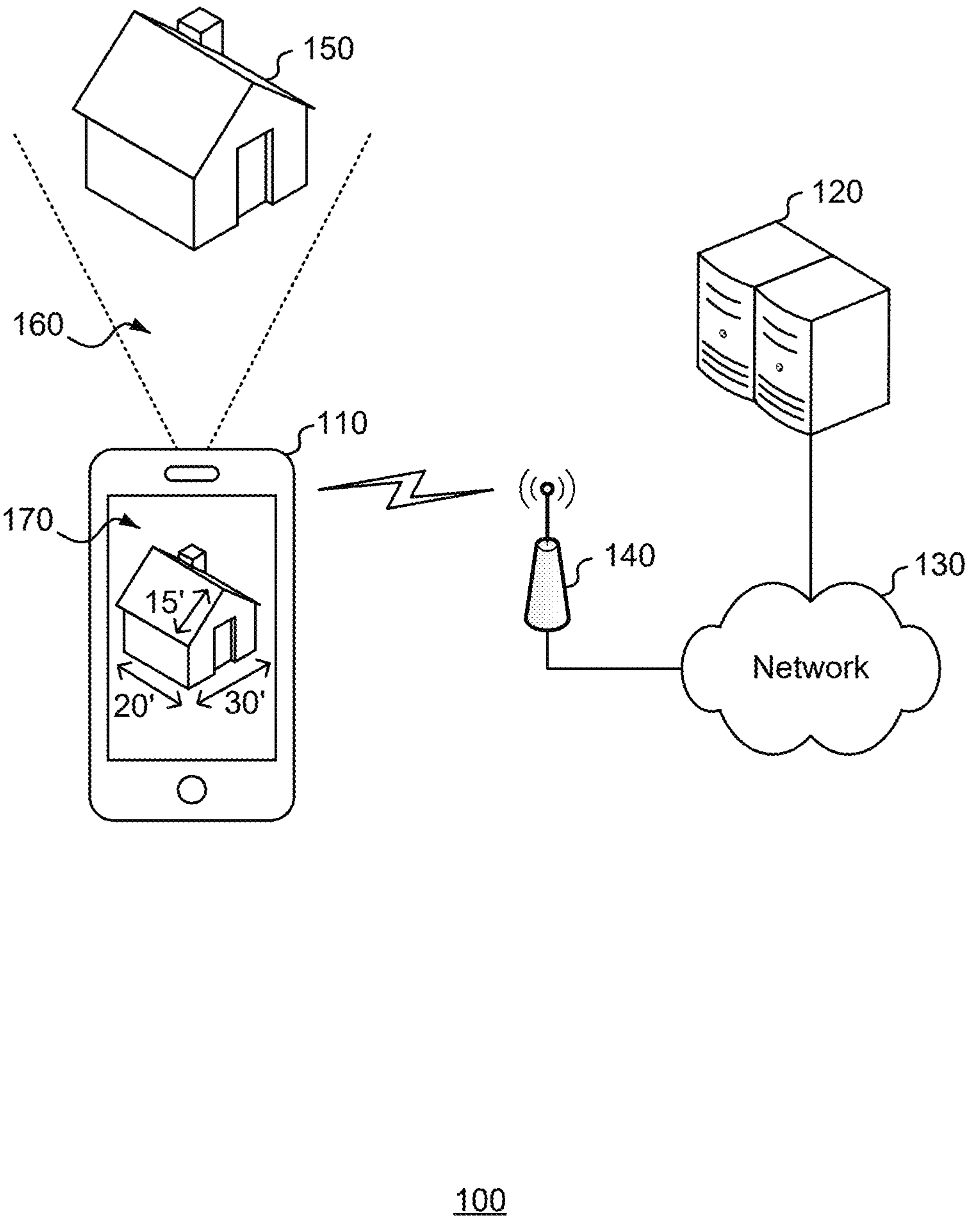
FIG. 1 is block diagram illustrating an example of a network environment, according to certain aspects of the present disclosure.

Digitally modeling physical structures can be time consuming and burdensome. In some situations, modeling a physical structure may involve a professional using specialized software to design a 3D model of a physical structure. Certain aspects and features of the present disclosure relate to processing a 2D image of a physical structure using computer-vision and machine-learning models to automatically generate a prediction of a 3D model of a physical structure. The predicted 3D model may digitally represent the 3D parameters (e.g., 3D shape, 3D orientation, 3D pose, etc.) of the physical structure based on a predicted fit between a known primitive and substructure keypoints.

In some implementations, an end-to-end model may be trained to predict the 3D parameters of a physical structure. The end-to-end model may include a 2D graph model layer fully connected with a 3D graph model layer in a single network. Each node of the 2D graph model layer and the 3D graph model layer may represent a keypoint. The 2D graph model layer may be trained to predict which subset of keypoints is visible and which subset of keypoints are not visible in the 2D image. Further, the 2D graph model may be trained to predict the locations of the non-visible keypoints within the 2D image (e.g., a 2D location of a non-visible "back apex" of the roof). The 2D graph model layer may generate a 2D visibility model that represents the predicted visibility of each keypoint and/or the prediction location of non-visible 2D keypoints. The 2D visibility model can be evaluated by the 3D graph model, which is trained to map the visible keypoints (based on the 2D visibility model) to points in a 3D space. The 3D graph model may optionally be trained to generate a deformation parameter that is used to deform a statistically average 3D shape (e.g., a known primitive) to predict a fit with the visible keypoints. The 2D graph model and the 3D graph model may be executed in concert, such that 3D parameters are generated for each predicted substructure (that is validated), and the combination of modeled substructures may be used to generate the 3D model of the entire physical structure. The end-to-end model may be trained using a training data set (e.g., of 3D data, instead of or in addition to using 2D image labels as a metric for performance) to learn complex relationships between 2D point configurations and the 3D parameters (e.g., 3D shape, 3D orientation, 3D position, etc.).

In some implementations, a solver network may be provided to classify pixels within a 2D image of a physical structure as structural lines (e.g., fascia lines, ridgelines, hip lines, etc.) or features (e.g., roof apex, eave, etc.) and identify coordinates of features or structural lines in the form of a feature map. The solver network may include one or more neural networks. Each neural network may be trained using supervised machine-learning techniques to infer a specific structural line or feature from the 2D image. After the structural lines and features have been detected, certain substructures may be identified. As a non-limiting example, if fascia lines, rake lines, and a roof ridgeline were classified within a 2D image, the solver network may use these classified lines or an associated feature map to define keypoints of a gable of a house in a 2D space. The solver network may execute a solver protocol to map keypoints of the defined 2D gable to 3D points of a known primitive of a 3D gable in a 3D domain. In some implementations, the 3D gable may be deformable and the solver network may predict a deformation of the deformable 3D gable that would fit the 2D gable defined by the classified structural lines in the 2D image. The resulting output may be a 3D model of the gable depicted in the 2D image. In other implementations, the solver network may execute a solver protocol to map keypoints of the defined 2D gable to 3D points of a known primitive of a 3D gable in a 3D domain, such by predicting a shape parameter and an orientation parameter. A shape parameter may be a combination of parameters for structural relations between substructures. In some embodiments, a shape parameter comprises at least one of a roof length, roof width, roof height, base length, base width, base height and roof-to-base spacing. Roof parameters may refer to facets or rooflines, while a base parameter may refer to walls. A roof to base spacing parameter permits complex geometry prediction for multiple substructures within a single parameter. A distance parameter may be predicted by the solver network using the keypoints or the 2D image, and the distance parameter may be used to adjust the 3D points in the 3D domain to account for a scaling factor based on the predicted distance of the structure in the 2D image from the camera or viewpoint.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is block diagram illustrating an example of a network environment 100, according to certain aspects of the present disclosure. Network environment 100 may include user device 110 and server 120. User device 110 may be any portable (e.g., mobile devices, such as smartphones, tablets, laptops, application specific integrated circuits (ASICs), and the like) or non-portable computing device (e.g., desktop computer, electronic kiosk, and the like). User device 110 may be connected to gateway 140 (e.g., a Wi-Fi access point), which provides access to network 130. Network 130 may be any public network (e.g., Internet), private network (e.g., Intranet), or cloud network (e.g., a private or public virtual cloud). User device 110 may communicate with server 120 through network 130.

A native or web application may be executing on user device 110. The native or web application may be configured to perform various functions relating to analyzing an image of a physical structure, such as a house. As an illustrative example, the native or web application may be configured to perform a function that captures a 2D image of house 150 within the camera's field of view 160. The function may also transmit the 2D image to server 120 for analysis. Server 120 may analyze the 2D image to automatically detect or compute the 3D dimensions of house 150 by evaluating the pixels of 2D image, according to certain implementations described herein. For example, server 120 may execute one or more computer vision techniques, such as feature detection and feature map determination, edge detection, or semantic image segmentation, to determine the 3D dimensions of house 150. Server 120 may transmit the detected or computed dimensions of house 150 to the native or web application executing on user device 110. In response to receiving the detected or computed dimensions of house 150, the native or web application may display a final image 170, which presents an overlay of the dimensions on top of the 2D image of house 150. The present disclosure is not limited to performing the function on server 120. The function can be entirely performed on user device 110 without the need for or use of server 120. Additionally, the present disclosure is not limited to the use of a native or web application executing on user device 110. Any executable code (whether or not the code is a native or web application) can be configured to perform at least a part of the function for algorithmically determining the dimensions of house 150.

Figure 2:
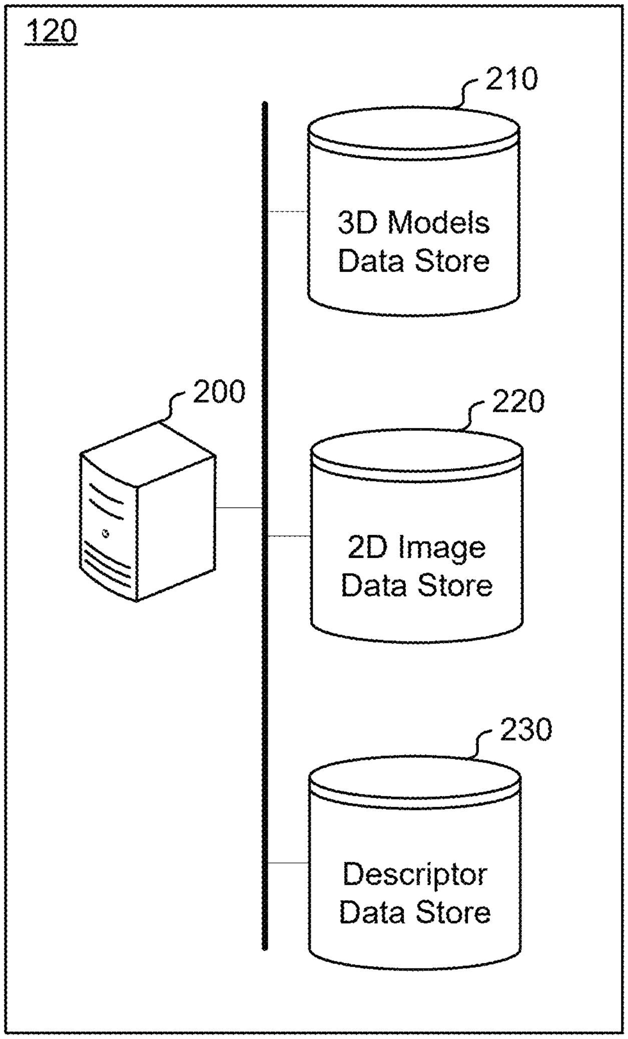
FIG. 2 is a block diagram illustrating another example of a network environment, according to certain aspects of the present disclosure.

FIG. 2 is a block diagram illustrating components of server 120, according to certain aspects of the present disclosure. In some implementations, server 120 may include several components, including a processor 200, 3D model data store 210, 2D image data store 220, and descriptor data store 230. Processor 200 may be a processor or processing apparatus (e.g., a server) configured to execute executable code that performs the various functions of server 120, according to implementations described herein. The executable code may be stored in a memory (not shown) associated with the processor 200. Processor 200 may be used to train and/or execute the end-to-end model, the solver network described herein, and other machine learning models described herein, such as region proposal models, 2D graph models, 3D graph models, or distance determination models, according to certain implementations described herein. The end-to-end model, the solver network, or the other machine learning models may be stored in or associated with the same or different databases (not shown).

3D model data store 210 may be configured to include a data structure that stores one or more existing 3D models of physical structures. Non-limiting examples of a 3D model of a physical structure include a CAD model, a 3D shape including a cuboid base with an angled roof, a pseudo-voxelized volumetric representation, mesh geometric representation, a graphical representation, a 3D point cloud, or any other suitable 3D model of a virtual or physical structure. The 3D models of physical structures may be generated by a professional or may be automatically generated (e.g., a 3D point cloud may be generated from a 3D camera). In some cases, the 3D model data store 210 may be used to store 3D models generated using techniques described herein.

2D image data store 220 may store 2D images of physical structures. The 2D images may be captured by professionals or users of the native or web application, or may be generated automatically by a computer (e.g., a virtual image). Referring to the example illustrated in FIG. 1, the image of house 150, which is captured by user device 110, may be transmitted to server 120 and stored in 2D image data store 220. The images stored in 2D image data store 220 may also be stored in association with metadata, such as the focal length of the camera that was used to capture the image, a resolution of the image, or a date and/or time that the image was captured. In some implementations, the images stored in 2D image data store 220 may depict top-down views of physical structures. In other implementations, the 2D image data store 220 may store images depicted ground-level views of houses, which can be evaluated using the end-to-end model, solver network, or other machine learning models described herein. Processor 200 may process the images to generate descriptors, for example, by detecting a set of keypoints (e.g., up to 14 keypoints, or more) within an image.

The images stored in 2D image data store 220 and/or the 3D models stored in 3D model data store 210 may serve as inputs to machine-learning or artificial-intelligence models. The images and/or the 3D models may be used as training data to train the machine-learning or artificial-intelligence models or as test data to generate predictive outputs. Machine-learning or artificial-intelligence models may include supervised, unsupervised, or semi-supervised machine-learning models.

In some examples, 2D images may be evaluated prior to use in generating a 3D model and/or prior to being stored in 2D image data store 220. For example, a 2D image may be subjected to processing by an image parameter evaluation system to determine the suitability of the 2D image for use in generating a 3D model. This may be calculated as an angular perspective score derived from an angle between a line or ray from the focal point of the camera to the point and the orientation of the surface or feature on which the point lies. The angle between the focal point of the camera and the surface of the physical structure informs a degree of depth information that can be extracted from the resulting captured image. For example, an angle of 45 degrees between the focal point of the camera and the surface of a physical structure can provide optimal image data for extracting depth information, which can improve the use of the techniques described herein to reconstruct a 3D model of the physical structure using 2D images.

Optionally, the processing by the image parameter system may be performed by server 120 or by user device 110 so as to evaluate a 2D image, such as to generate an angular perspective score. In some cases, evaluation of the 2D image may occur in real-time as the image is captured (e.g., on and by user device 110). In other cases, evaluation of the 2D image may occur after capture, such as on and by user device 110 or by server 120 after receiving the 2D image from user device 110. The angular perspective score may indicate a proximity of the angle between the focal point of the camera and the surface of the physical structure to a particular value, such as 45 degrees. Various techniques may be used to evaluate the angular perspective score based on the angle, such as the absolute value of an angle difference from 45 degrees, a percentage difference of the angle compared to 45 degrees, etc.

In some examples, the angular perspective score may be compared with a threshold value or range and a notification can be generated if the angular perspective score is outside of threshold value or range to indicate that an additional 2D image should be captured at a different camera position with respect to the physical structure, such as to improve the use of the image in generating a 3D model of the structure. In some examples, the notification can provide instructions to the use for a direction or distance to move the camera before capturing the additional 2D image. In some examples, an instructive prompt can be generated while a user is framing the physical structure within a viewfinder or on a display of the user device 110, thereby guiding the user to capture images with an optimal or improved angle relative to the surface of the physical structure. For example, a native application executing on a user device may provide an augmented reality (AR) output and indicate an angular perspective score or other suitability score, indicate whether a camera position falls in or outside of a target threshold position or range, an angular perspective score threshold value or range, or other suitability score threshold value or range, or indicate instructions for adjusting a position of the camera to improve the position, angular perspective score, or other suitability score.

Descriptor data store 230 may be a data structure that stores the various descriptors for the 3D models stored in 3D model data store 210. Each descriptor may be stored with a tag, flag, or other identifying code that can be used to identify the corresponding 3D model that is represented by the descriptor. In some implementations, a descriptor may be generated using an image of a top-down view of a physical structure (e.g., a roof). In other implementations, a descriptor may be generated using a synthetic (e.g., virtual) image of one or more orthographic views of a physical structure. In yet other implementations, a descriptor may be generated based on a 3D model of a physical structure that is reconstructed from a two-dimensional (2D) image. In these implementations, a descriptor may be a vector of binary or numeric values. For example, a 2D image of a roof of a physical structure or a 3D voxelization of a physical structure may be subdivided into multiple portions or evaluated at different spatial scales. Each vector element may correspond to one of the portions of the subdivided image or one of the spatial scales. The binary value of a vector element of the vector may be determined based on the existence or absence of a structural feature within the portion of the 2D image that corresponds to the vector element. In yet other implementations, a descriptor may be generated using trained machine-learning models, such as an auto-encoder neural network. For example, a descriptor may be a condensed representation of the 3D model. The condensed representation may be generated using an auto-encoder neural network. An auto-encoder neural network may be trained using a training data set of real image, synthetic images, or voxelized 3D models of physical structures. The auto-encoder neural network may produce a compressed representation (e.g., a latent-space representation) at a center layer, retaining certain features of the input image or voxelization. After training, this compressed representation can directly be used as the representative descriptor for the corresponding 3D model.

Figure 3:
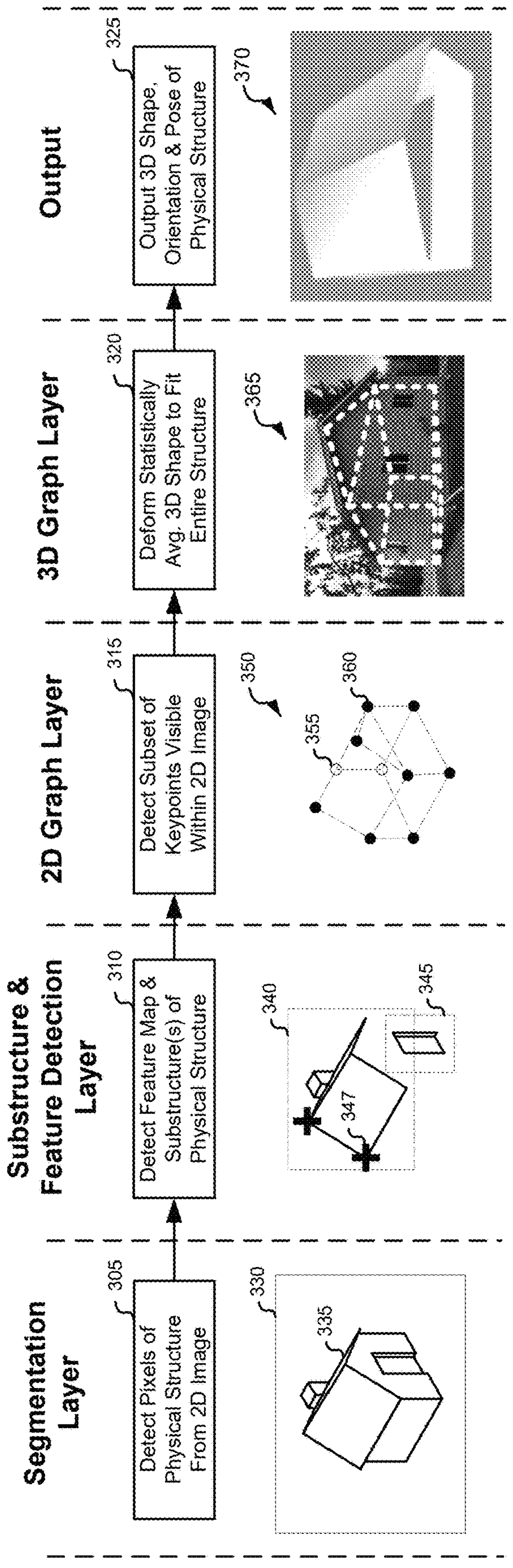
FIG. 3 is a diagram illustrating an example of a process flow for predicting a 3D representation of a physical structure in a 2D image, according to certain aspects of the present disclosure.

FIG. 3 is a diagram illustrating an example of a process flow for predicting a 3D representation of a physical structure captured in a 2D image, according to certain aspects of the present disclosure. Process flow 300 may represent certain operations performed by an end-to-end model for predicting the 3D model of a house 335 captured in 2D image 330. Process flow 300 may be performed, at least in part, by or using any of the components illustrated in FIGS. 1-2, such as user device 110, server 120, 2D image data store 220, and 3D model data store 210. Further, process flow 300 may be performed in a single network, in which a 2D graph layer is fully connected with a 3D graph layer to predict a fit of a statistically average 3D shape (e.g., a known primitive) to substructure(s) inferred and validated within 2D image 330.

Process flow 300 begins at block 305, where the end-to-end model includes a segmentation layer, which analyzes 2D image 330 to detect regions of interest, such as pixels that relate to a structure of a house. The segmentation layer may detect pixels that relate to a house and pixels that do not relate to a house. At block 310, a substructure and feature detection or feature mapping layer may include a region proposal network trained to analyze the pixels relating to a house and generate a bounding box to surround each inferred substructure of the house. The region proposal network may be trained to predict the location of anchor points for each bounding box. Further, the region proposal network may predict the width and height of each bounding box surrounding the inferred or proposed substructure of house 335 (e.g., a gable). To illustrate and only as a non-limiting example, the region proposal network may detect a region of interest surrounding the roof of house 335 and another region of interest surrounding the front door of house 335. The region proposal network may generate a prediction of a width and height (and the anchor points) of bounding box 340 to surround the pixels that the region proposal network proposes as a roof. Similarly, the region proposal network may generate a prediction of a width and height (and the anchor points) of bounding box 345 to surround the pixels that the region proposal network proposes as a front door.

Additionally, the substructure and feature detection or mapping layer may analyze the pixels within each of bounding boxes 340 and 345 to infer which pixel(s) correspond to a feature (e.g., a structural intersection of a building), such as feature 347. As a non-limiting example, the substructure and feature detection layer may be configured to search for up to 14 features within each bounding box. However, 14 features is an example, and thus, the present disclosure is not limited thereto. The substructure and features detection or mapping layer may be configured to search for any number of features within in each bounding box. Each substructure may be associated with a subset of features. If the feature(s) detected within bounding box 340 match the subset of features that correspond to a roof, then the substructure and feature detection or mapping layer may validate that bounding box 340 includes pixels relating to a roof. The same process may be performed for the pixels within bounding box 345. All the features detected in the image may be compiled as a feature map, including coordinates of the different features detected in the image. After feature detection, the feature map may be used to generate a set of 2D keypoints, which are then used to generate 3D points, with the 3D points corresponding to a statistically average 3D shape (e.g., a gable) that may be identified because each keypoint is uniquely identifiable from among the other keypoints. For example, when the substructure and feature detection layer detects a "front apex" feature, the layer may query a lookup table to associate the "front apex" feature to a keypoint with a corresponding point on the statistically average 3D shape (e.g., the primitive of the 3D gable).

At block 315, the features detected within each of bounding box 340 and bounding box 345 may be fed as inputs into a 2D graph layer (e.g., a 2D graph neural network model) as a set of features or feature map. The 2D graph layer may be trained to use the feature map to predict the location of visible and non-visible keypoints based on similar patterns of 2D keypoints in a 2D image space learned during training. For example, the 2D graph layer may predict that a non-visible keypoint 355 exists. Further, the 2D graph layer may generate 2D visibility model 350 that indicates the visibility of each keypoint. The 2D visibility model 350 may be a 2D graph that indicates the visibility of each keypoint extracted or predicted within a bounding box. The 2D visibility model may include nodes that are connected to each other. Each node may correspond to a keypoint extracted from a bounding box. The connectedness of nodes in the graph networks represents the correlation between node A's position and node B's position from the training data. The 2D visibility model 350 may indicate that predicted keypoint 355 is not visible in 2D image 330, whereas, keypoint 360 is visible within 2D image 330.

At block 320, the 2D visibility model 350 may be inputted into a 3D graph layer (e.g., a 3D graph neural network model that is executed in concert with 2D graph layer). The 3D graph layer may be trained to map each keypoint from the 2D visibility model 350 to a statistically average 3D shape (e.g., a known primitive that corresponds to the validated substructure included in a bounding box). The statistically average 3D shape may be derived from the average of primitives as detected within the training data. The 3D graph layer may also be trained to deform the statistically average 3D shape of the validated substructure within the corresponding bounding box. Deforming may be performed when the 3D graph layer generates a prediction of a deformation parameter that is used to deform the statistically average 3D shape. The deformation parameter may be any value that is used to modify one or more dimensions of the statistically average 3D shape to fit house 335 depicted in 2D image 330. For example, as in matched image 365, the 3D graph layer generates a prediction of a deformation of the statistically average 3D shape of a gable (shown by the white dashed lines) that fits the 2D gable depicted in the matched image 365.

At block 325, the end-to-end model may generate an output that represents the 3D model 370 of house 335. The end-to-end model may combine the predicted 3D model of each substructure detected in 2D image 330 to generate the 3D model 370 of the entire house 335. The 3D model 370 may be defined by one or more 3D parameters. Non-limiting examples of 3D parameters include a 3D shape (e.g., a width, height, and depth), a 3D orientation (e.g., a front vector of house 335 may be at 90 degrees), and a 3D pose (e.g., a position within the 3D space). The 3D model 370 of house 335 may then be evaluated by a user, for example, to visualize proposed improvements to house 335.

Figure 4:
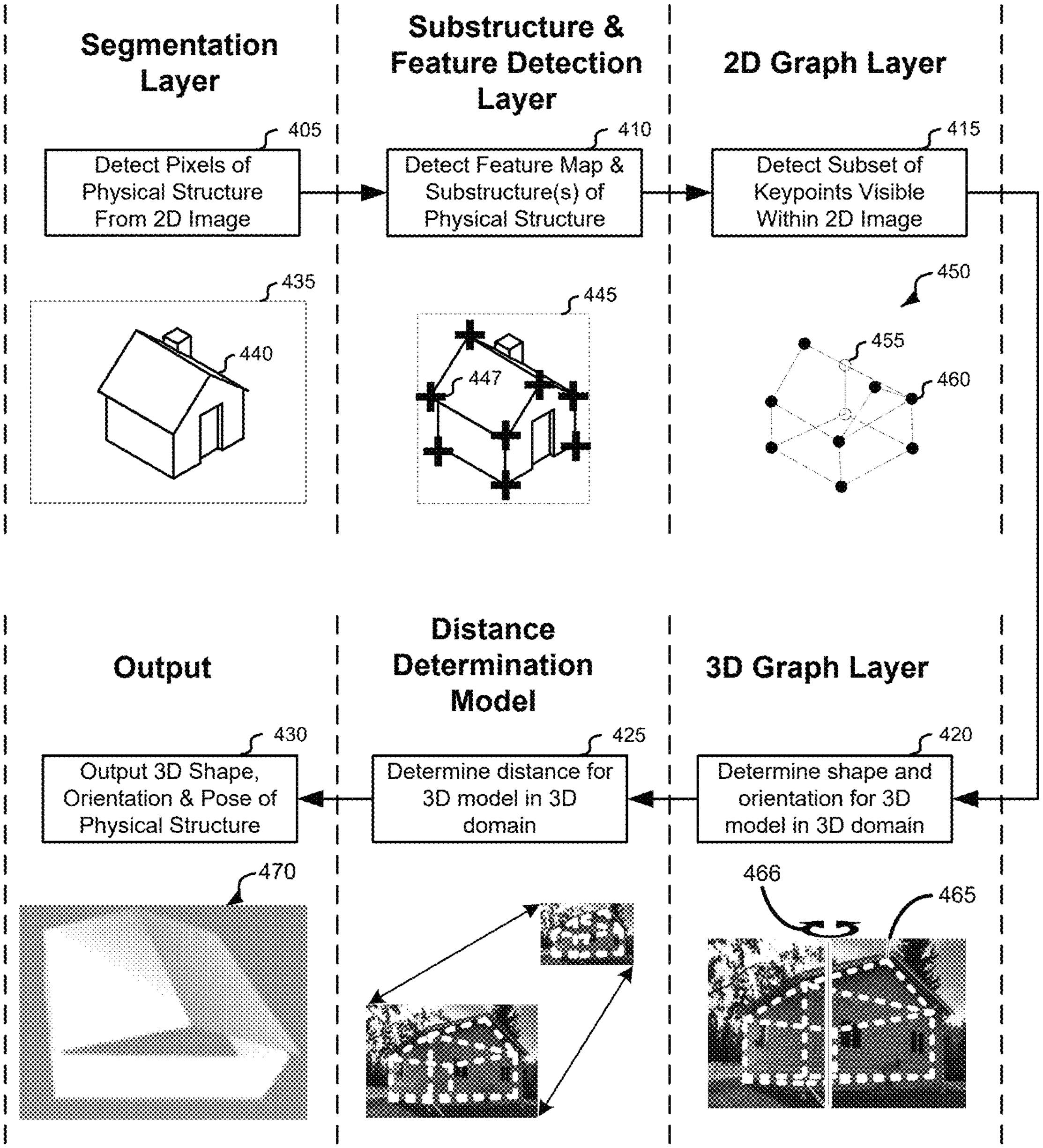
FIG. 4 is a diagram illustrating an example of a process flow for predicting a 3D representation of a physical structure in a 2D image, according to certain aspects of the present disclosure.

FIG. 4 is a diagram illustrating an example of a process flow for predicting a 3D representation of a physical structure captured in a 2D image, according to certain aspects of the present disclosure. Process flow 400 may represent certain operations performed by an end-to-end model for predicting the 3D model of a house 440 captured in 2D image 435. Process flow 400 may be performed, at least in part, by or using any of the components illustrated in FIGS. 1-2, such as user device 110, server 120, 2D image data store 220, and 3D model data store 210. Further, process flow 400 may be performed in a single network, in which a 2D graph layer is fully connected with a 3D graph layer to predict a shape and orientation of a 3D model that is combined with a determined distance to generate an output 3D model 470 for house 440.

Process flow 400 begins at block 405, where the end-to-end model includes a segmentation layer, which analyzes 2D image 435 to detect regions of interest, such as pixels that relate to a structure of a house. The segmentation layer may detect pixels that relate to a house and pixels that do not relate to a house. At block 410, a substructure and feature detection or feature mapping layer may include a region proposal network trained to analyze the pixels relating to a house and generate a bounding box to surround each inferred substructure of the house. The region proposal network may be trained to predict the location of anchor points for each bounding box. Further, the region proposal network may predict the width and height of each bounding box surrounding the inferred or proposed substructure of house 440 (e.g., a gable). To illustrate and only as a non-limiting example, the region proposal network may detect a region of interest surrounding the front gable of house 440. The region proposal network may generate a prediction of a width and height (and the anchor points) of bounding box 445 to surround the pixels that the region proposal network proposes as a roof. If multiple gables are present, the region proposal network may generate a separate bounding box for the additional gables.

Additionally, the substructure and feature detection or mapping layer may analyze the pixels within bounding box 440 to infer which pixels correspond to a feature (e.g., a structural intersection of a building), such as feature 447. As a non-limiting example, the substructure and feature detection layer may be configured to search for up to 14 features within each bounding box. However, 14 features is an example, and thus, the present disclosure is not limited thereto. In FIG. 4, 8 features are shown as identified. The substructure and features detection or mapping layer may be configured to search for any number of features within in each bounding box. Each substructure may be associated with a subset of features. If the feature(s) detected within bounding box 445 match the subset of features that correspond to a roof, then the substructure and feature detection or mapping layer may validate that bounding box 445 includes pixels relating to a roof. All the features detected in the bounding box 445 may be compiled as a feature map, including coordinates of the different features detected in the image.

At block 415, the features detected within bounding box 445 may be fed as inputs into a 2D graph layer (e.g., a 2D graph neural network model) as a set of features or feature map. The 2D graph layer may be trained to use the feature map to predict the location of visible and non-visible keypoints based on similar patterns of 2D keypoints in a 2D image space learned during training. For example, the 2D graph layer may predict that a non-visible keypoint 455 exists. Further, the 2D graph layer may generate 2D visibility model 450 that indicates the visibility of each keypoint. The 2D visibility model 450 may be a 2D graph that indicates the visibility of each keypoint extracted or predicted within a bounding box, providing a visibility score (e.g., between 0 and 1) indicating the likelihood that the keypoints are visible. The 2D visibility model 450 may indicate that predicted keypoint 455 is likely not visible in 2D image 430 (e.g., has a low visibility score, such as less than or about 0.2), whereas, keypoint 460 is likely visible within 2D image 430 (e.g., has a high visibility score, such as greater than or about 0.8). In some cases, the 2D graph layer may adjust the positions of non-visible keypoints using the pattern of visible keypoints based on pattern recognition learned during the training process for the 2D graph layer.

At block 420, the keypoint positions and visibility scores may be inputted into a 3D graph layer (e.g., a 3D graph neural network model that is executed in concert with 2D graph layer). The 3D graph layer may be trained to generate a 3D shape 465, such as by predicting the most likely positions of the keypoints in a 3D domain based on parameters learned during training of the 3D graph layer. The 3D graph layer may also be trained to generate a 3D orientation 466, such as by predicting the most likely orientation of the 3D model, as defined by the positions of the keypoints in the 3D domain based on parameters learned during training of the 3D graph layer. The prediction of the 3D shape 465 and the 3D orientation 466 may be performed independently from one another or may be performed together. In some cases, when prediction of the 3D shape 465 and the 3D orientation 466 are performed independently from one another, the 3D graph layer can feed back information from each determination to the opposite determination to ensure that the predicted 3D shape 465 and 3D orientation 466 agree with one another.

At block 425, a distance determination model may evaluate the feature map generated by the substructure and feature detection layer and may optionally use the 2D image 435 to predict the distance of the house 440 from the camera used to capture the 2D image 435. In some examples, the distance determination model may be a feedforward neural network model, such as a multilayer or single-layer perceptron model, trained to predict distances based on input feature maps and/or 2D images (or portions thereof). In some examples, the distance may be predicted using features present in the 2D image 435, such as a door or a wall, which may correspond to a fixed or standardized height object. The process may involve determining a pixel scale based on the fixed or standardized height object and using the pixel scale to predict the distance.

At block 430, the end-to-end model may generate an output that represents the 3D model 470 of house 440. The end-to-end model may combine the predicted 3D shape 465, the predicted 3D orientation 466, and the predicted distance for each substructure detected in 2D image 430 to generate the 3D model 470 of the entire house 440. The 3D model 470 may be defined by one or more 3D parameters. Non-limiting examples of 3D parameters include a 3D shape (e.g., a width, height, and depth), a 3D orientation (e.g., a front vector of house 440 may be at 90 degrees), and a 3D pose (e.g., a position within the 3D space). The 3D model 470 of house 440 may then be evaluated by a user, for example, to visualize proposed improvements to house 440.

Figure 5:
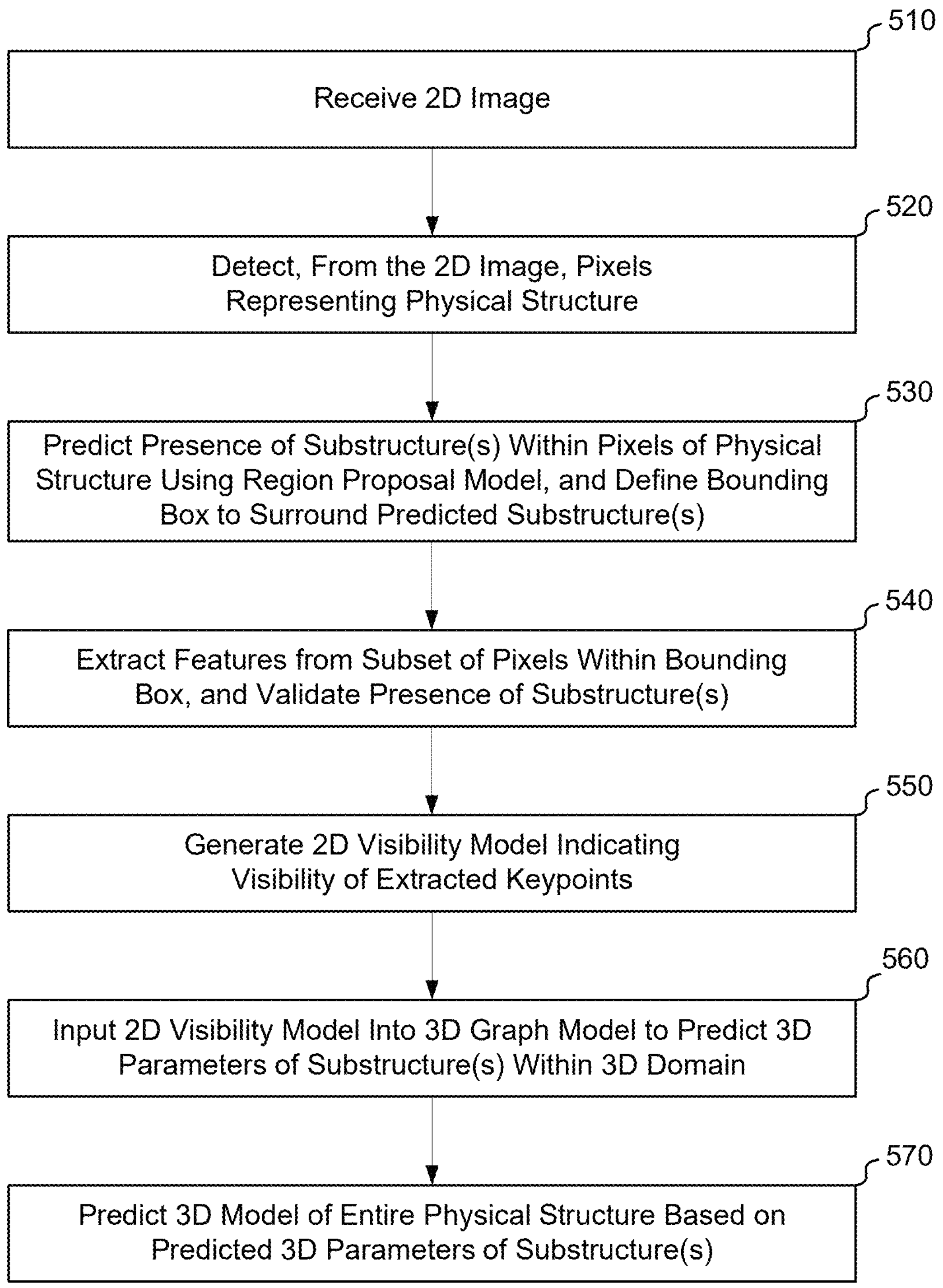
FIG. 5 is a flowchart illustrating an example of a process for generating a best-fit 3D representation of a physical structure in a 2D image, according to certain aspects of the present disclosure.

FIG. 5 is a flowchart illustrating an example of a process for generating a best-fit 3D model of a physical structure depicted in a 2D image, according to certain aspects of the present disclosure. Process 500 may represent certain operations performed by an end-to-end model for predicting the 3D model of a physical structure captured in a 2D image. Process 500 may be performed, at least in part, by any of the components illustrated in FIGS. 1-2, such as user device 110, server 120, 2D image data store 220, and 3D model data store 210. Further, process 500 may be performed in a single network, in which a 2D graph layer is fully connected with a 3D graph layer to predict a fit of a statistically average 3D shape (e.g., a known primitive) to substructure(s) inferred and validated within the 2D image.

Process 500 begins at block 510, where the end-to-end model receives a 2D image captured using any digital camera. In some implementations, the 2D image captures a real-world scene with a physical structure. In other implementations, the 2D image may be a professionally drawn 2D image. At block 520, the 2D image may be inputted into a trained segmentation layer of the end-to-end model. The segmentation layer may be trained to detect pixels relating to a physical structure, such as a house. The segmentation layer may generate a mask to isolate the pixels relating to the house.

Figure 12:
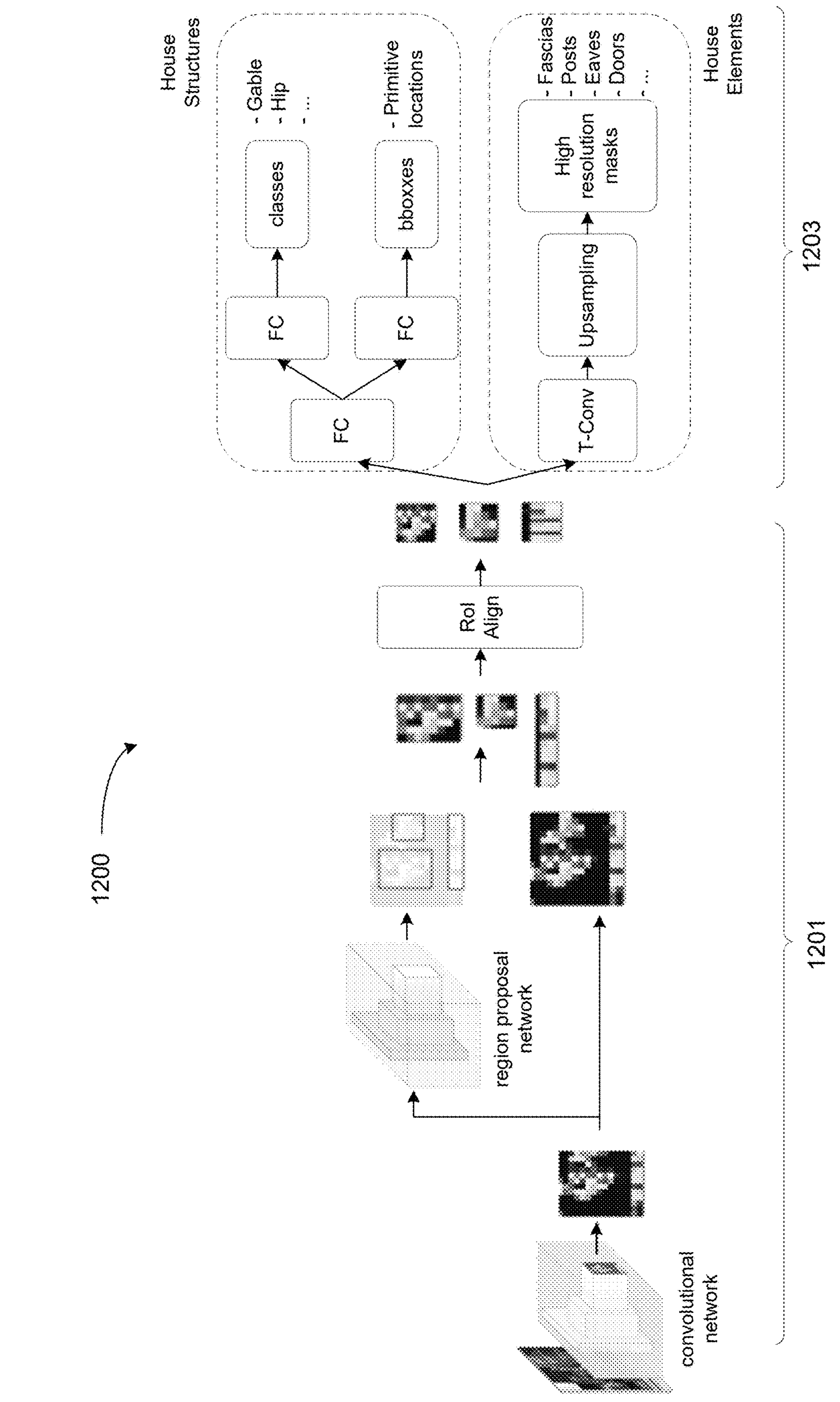
FIG. 12 is an image of a network architecture for predicting bounding boxes for structural analysis of a 2D image, according to certain aspects of the present disclosure.

At block 530, the pixels relating to a house may be inputted into a substructure and feature detection layer. The substructure and feature detection layer may include a region proposal network trained to evaluate the pixels relating to the house and infer that certain pixels relate to a substructure, such as a gable, a roof, a porch, etc. A binary mask classifier may be trained to classify the inferred substructures. For each substructure, the substructure and feature detection layer may generate a bounding box that surrounds the region of interest relating to that substructure. The bounding box may be defined by one or more anchor points, and a width and a height. As a non-limiting example, the substructure and feature detection layer may be a MaskRCNN neural network model. The structure RCNN of FIG. 12 illustrates a sample network 1200 for identifying a relevant bounding box for optimizing a 3D shape or predicting a parameterized shape according to various embodiments. Similar in architecture to mask RCNN in the art using early networks heads 1201 for region proposal and alignment to a region of interest, the structure RCNN of FIG. 12 adds additional elements 1203 for more specific capabilities, such as grouping. Whereas traditional mask RCNN may detect individual elements separately, such as sub-components or features and sub-features of a house, the structure RCNN first detects an overall target such as House Structures (primitives like gables and hips) and then predicts masks for sub-components such as House Elements (fascias, posts, eaves, rakes, etc.). Whereas the House Elements head of network 1200 may use a combination of transpose convolution layer and upsampling layer, the House Structures head uses a series of fully connected layers to identify structural groupings within an image. This output may be augmented with the House Elements data, or the activation map data from the previously discussed network, to produce classified data within a distinct group. In other words, the structure RCNN network 1200 can discern multiple sub-components or sub-structures within a single parent structure to avoid additional steps to group these subcomponents after detection into an overall target. This avoids fitting a bounding box for all primitives or sub-structures, and distinguishes which sub-structure any one subfeature may group to. Again using the gable detection illustrative use case, structure RCNN can identify a cluster of features first and then assign them as grouped posts to appropriate rakes to identify distinct sub-structures comprising those features, as opposed to predicting all rakes and posts in an image indicate "gable pixels."

Figure 13A:
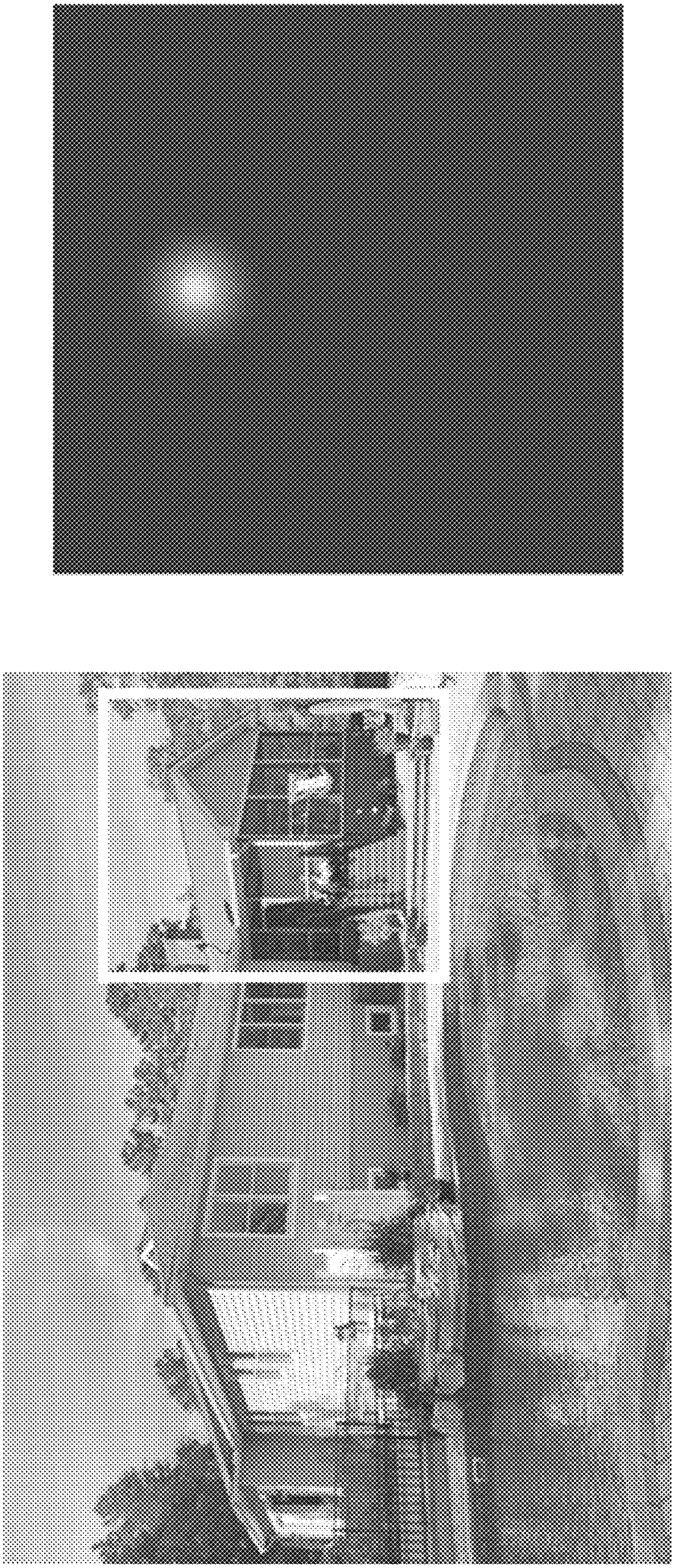
FIG. 13A and FIG. 13B are images of keypoint processing, according to certain aspects of the present disclosure.

After the bounding box(es) have been defined, at block 540, the substructure and feature detection layer may extract feature(s) detected within each bounding box. A feature may be a group of pixels that depict a key structural intersection, such as a front apex that represents a location where the ridge intersects with two rake lines. In some cases, features may directly correspond with keypoints in a 2D graph layer. The features detected within each bounding box may be compared to the subset of elements that correspond to the substructure that is inferred to be depicted by pixels within the bounding box. For example, if the inferred substructure within a bounding box is a gable, the features that would or should have been detected in the bounding box include the front apex and at least two eaves in order for the gable to be validated as being present within the bounding box. In some embodiments, the MaskRCNN generates a heatmap of predicted keypoint locations for a given keypoint specific to such heatmap's channel. FIG. 13A illustrates such a channel prediction, though FIG. 13A illustrates a single keypoint channel (for an apex keypoint) all given keypoints for a structural arrangement (and not keypoints identified in the image) are analyzed, even keypoints for a given substructure (like a gable) that are not observed will be predicted.

Figure 13B:
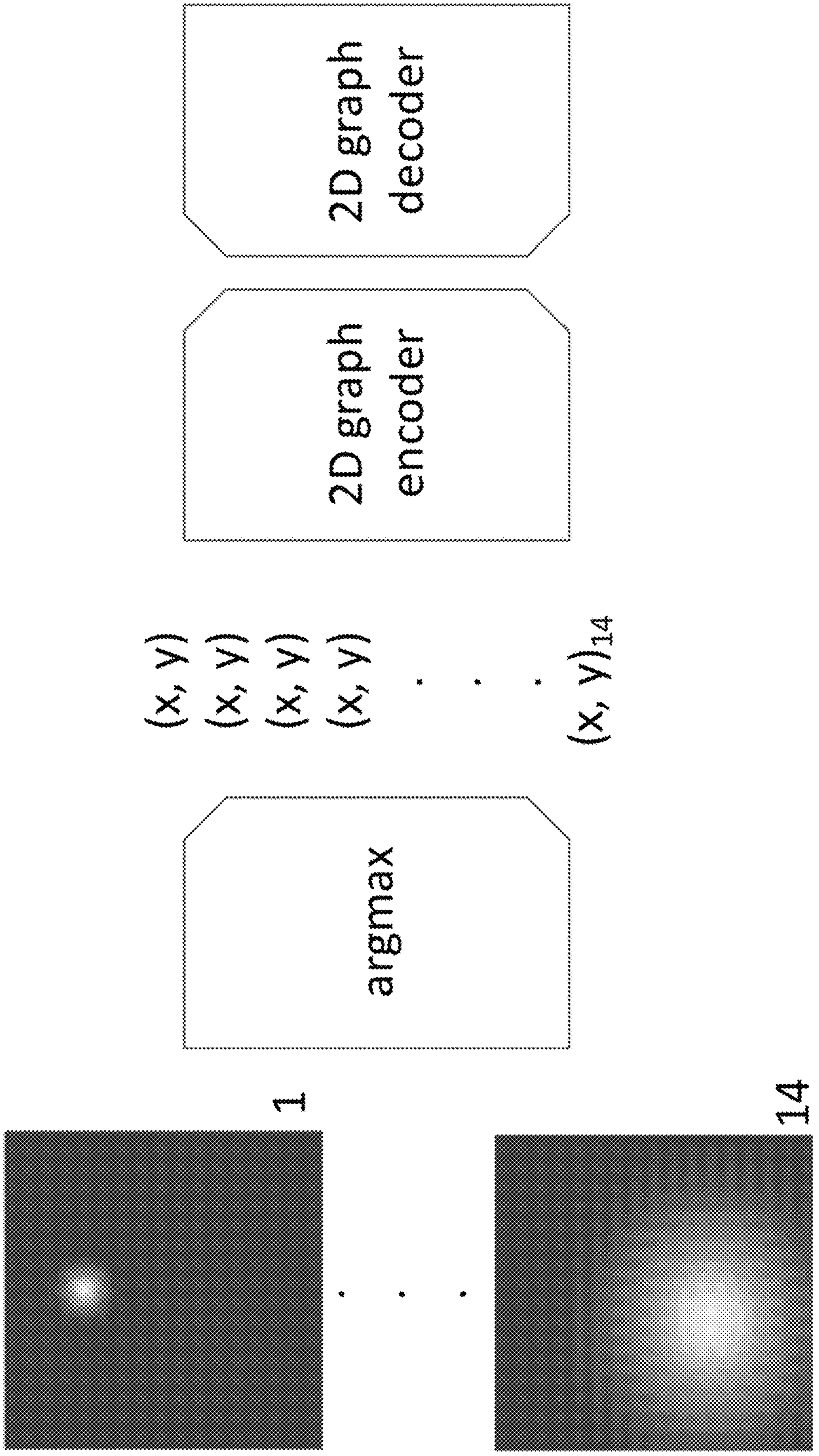

At block 550, the features detected within a bounding box may be inputted into a 2D graph layer of the end-to-end model to generate a set of keypoints for a 3D model represented in the 2D domain of the image. The 2D graph layer may be trained to generate a 2D visibility model that indicates the visibility of the keypoints within the 2D image. As part of generating the 2D visibility model, the 2D graph layer may be trained to predict a location of each non-visible keypoint. For example, if a front apex is detected as a keypoint, a back apex may not be visible in the 2D image, but the 2D graph layer may be trained to predict the existence of a non-visible back apex of the roof. The 2D visibility model may be graph configured with nodes, some of which may be connected to each other. Each node may correspond to a keypoint, and two keypoints connected in the 2D visibility model represent two structural intersection points, each two eaves, connected by a structural line, such as a fascia line. Each node of the 2D visibility model may indicate visibility information that represents a prediction of whether or not that node is visible within the 2D image. FIG. 13B illustrates a plurality of keypoint channel heatmaps (1 through 14 for a given keypoint association to a gable); with channel 1 representing a likely visible keypoint due to localized placement and distribution, and channel 14 representing a likely nonvisible keypoint due to broad or randomized distribution and placement within the heatmap. These channel outputs may be fed into the 2D graph layer after an argmax localization function for the 2D encoder component of the 2D graph layer to determine which locations are consistent with known structural patterns; inconsistent keypoint locations are deemed "occluded" by data of the original image. A 2D graph decoder may move occluded points to statistically match the given structural pattern.

At block 560, the 2D visibility model may be inputted into a 3D graph layer trained to map the keypoints detected within a bounding box to 3D points on a statistically average 3D shape corresponding to the validated substructure of that bounding box. For example, if a bounding box is defined around a validated gable, each detected keypoint of the 2D gable (depicted in the 2D image) may be mapped to a 3D point on a statistically average 3D gable; in some embodiments, nondetected keypoints are inferred by the localization of detected keypoints. Additionally, the 3D graph layer may be trained to generate a prediction of one or more deformation parameters that are used to modify the dimensions of the statistically average 3D gable to fit the 2D gable depicted in or predicted from the 2D image. The deformed version of the statistically average 3D gable may represent the predicted 3D model of the 2D gable. At block 570, the 3D model for the entire physical structure may be generated based on the 3D parameters of the 3D models of the validated substructures in combination.

Figure 6:
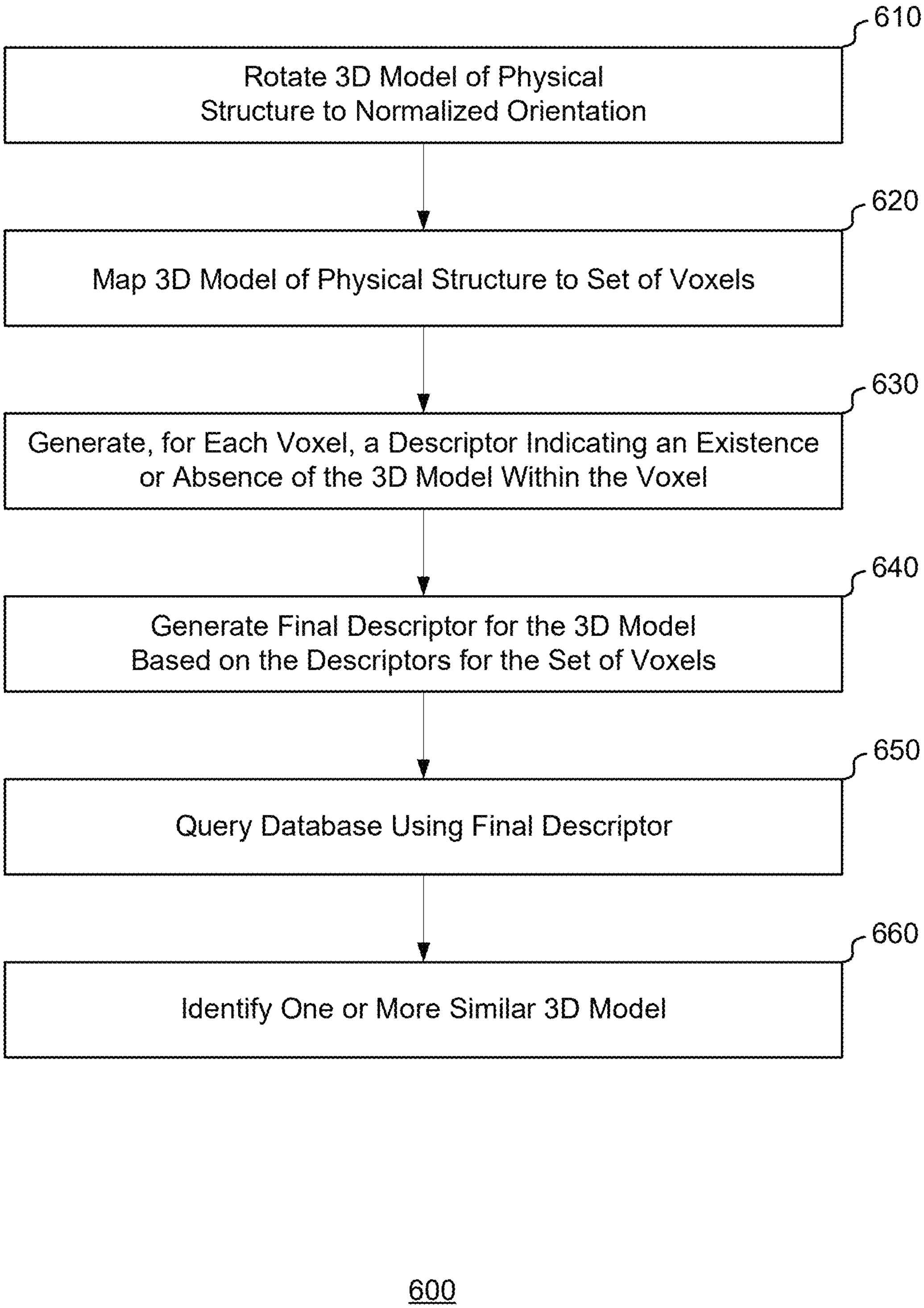
FIG. 6 is a flowchart illustrating an example of a process for generating a descriptor for a 3D representation of a physical structure and querying a database to identify similar 3D representations, according to certain aspects of the present disclosure.

FIG. 6 is a flowchart illustrating an example of a process for generating a descriptor for a 3D representation of a physical structure and querying a database to identify similar 3D representations, according to certain aspects of the present disclosure. Process 600 may be performed, at least in part, by any of the components illustrated in FIGS. 1-2, such as user device 110, server 120, 2D image data store 220, and 3D model data store 210.

Process 600 may begin at block 610, where the predicted 3D model of the physical structure (e.g., the output of the end-to-end model) may be rotated to normalize the orientation of the 3D model. As a non-limiting example, a 2D projection of the ridgeline of the 3D model of a physical structure onto the ground plane may be rotated to normalize the orientation of the 3D model. At block 620, the 3D model of the physical structure may be mapped to a set of voxels. At block 630, for each voxel of the set of voxels, server 120 may determine which subset of structure features are detected within the voxel. For example, the existence or absence of a particular structural feature (e.g., a front apex) within the voxel may be represented by a bit (e.g., a binary value). At block 640, the N bits for the N voxels of the set of voxels can be concatenated to generate the final descriptor that represents the image. At block 650, the final descriptor may be used to query pre-existing descriptors to determine pre-existing 3D models that are similar in structure. For example, similarity between two descriptors (and it follows, structural similarity between two 3D models) may be represented by a Hamming distance between the two descriptors. However, the present disclosure is not limited to the use of Hamming distance. In some implementations, feature vectors may be generated for each 3D model using feature extraction techniques. The feature vectors may be compared in a Euclidean or cosine space to represent the structural similarity between two 3D models. At block 660, one or more pre-existing 3D models may be identified as being structurally similar to the predicted 3D model (e.g., the output illustrated in FIG. 3) based on the Hamming distance between the corresponding descriptors.

Figure 7:
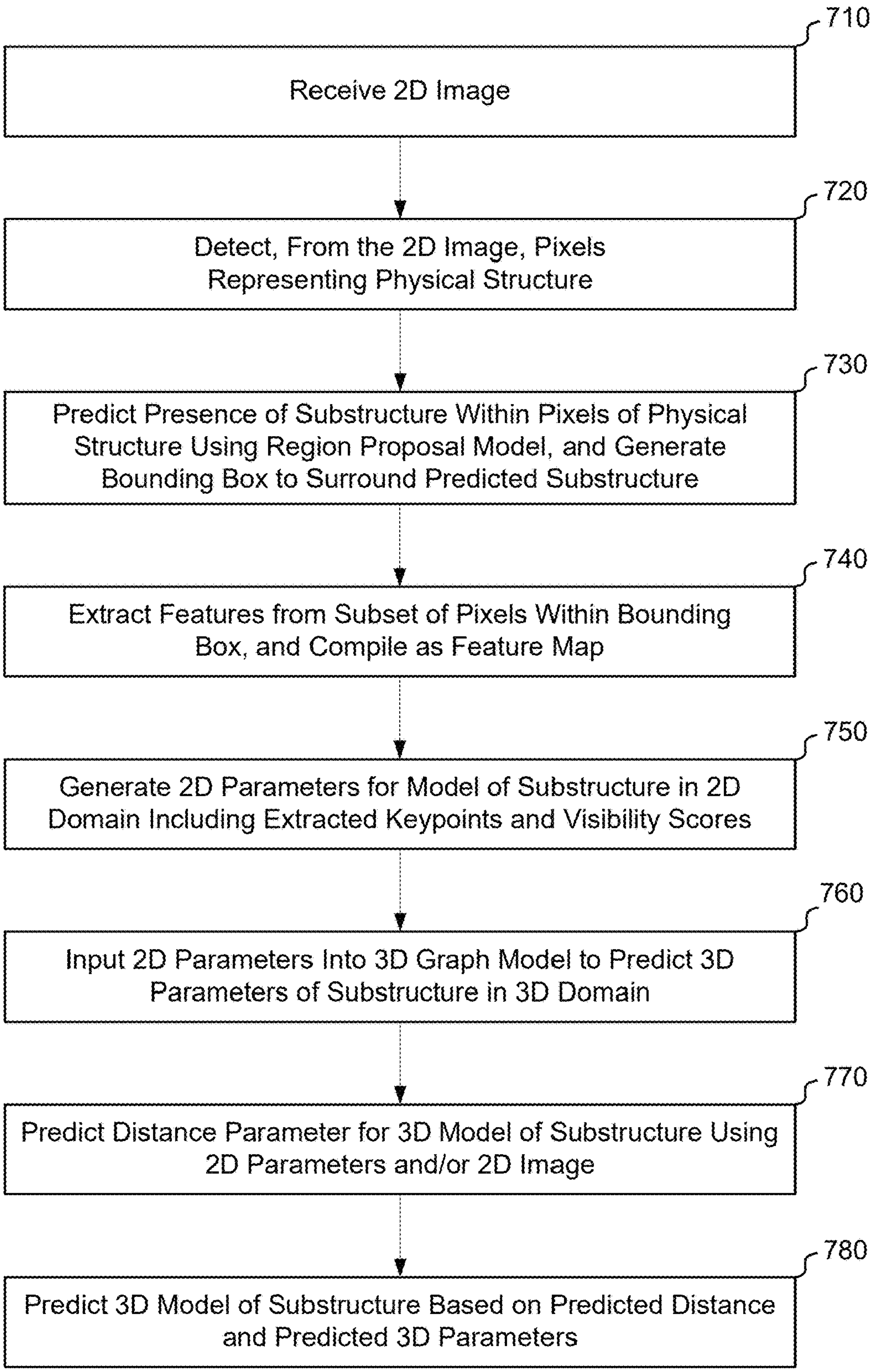
FIG. 7 is a flowchart illustrating an example of a process for generating a 3D representation of a physical structure in a 2D image, according to certain aspects of the present disclosure.

FIG. 7 is a flowchart illustrating an example of a process for generating a 3D model of a physical structure depicted in a 2D image, according to certain aspects of the present disclosure. Process 700 may represent certain operations performed by an end-to-end model for predicting the 3D model of a physical structure captured in a 2D image. Process 700 may be performed, at least in part, by any of the components illustrated in FIGS. 1-2, such as user device 110, server 120, 2D image data store 220, and 3D model data store 210.

Process 700 begins at block 710, where the end-to-end model receives a 2D image captured using any digital camera. In some implementations, the 2D image captures a real-world scene with a physical structure. In other implementations, the 2D image may be a professionally drawn 2D image. At block 720, the 2D image may be inputted into a trained segmentation layer of the end-to-end model. The segmentation layer may be trained to detect pixels relating to a physical structure, such as a house. The segmentation layer may generate a mask to isolate the pixels relating to the house.

At block 730, the pixels relating to a house may be inputted into a substructure and feature detection layer. The substructure and feature detection layer may include a region proposal network trained to evaluate the pixels relating to the house and infer that certain pixels relate to a substructure, such as a gable, a roof, a porch, etc. A binary mask classifier may be trained to classify the inferred substructures. For each substructure, the substructure and feature detection layer may generate a bounding box that surrounds the region of interest relating to that substructure. The bounding box may be defined by one or more anchor points, and a width and a height. As a non-limiting example, the substructure and feature detection layer may be a MaskRCNN neural network model.

After the bounding box has been defined, at block 740, the substructure and feature detection layer may extract features detected within the bounding box and compile information for all detected features as a feature map. A feature may be a group of pixels that depict a key structural intersection, such as a front apex that represents a location where the ridge intersects with two rake lines. In some cases, features may directly correspond with visible keypoints or nodes in a 2D graph layer. The features detected within each bounding box may be compared to the subset of elements that correspond to the substructure that is inferred to be depicted by pixels within the bounding box. For example, if the inferred substructure within a bounding box is a gable, the features that would or should have been detected in the bounding box include the front apex and at least two eaves in order for the gable to be validated as being present within the bounding box.

At block 750, the features detected within a bounding box may be inputted into a 2D graph layer of the end-to-end model to generate 2D parameters including a set of keypoints for a 3D model represented in the 2D domain of the image. The 2D graph layer may be trained to predict a 2D visibility score for each of the keypoints, corresponding to a likelihood that a keypoint would be visible in the 2D image, for example. As part of generating the 2D visibility score, the 2D graph layer may be trained to predict a location of all the keypoints (e.g., 14 keypoints for a cuboid base with an angled roof), including each non-visible keypoint. For example, if a front apex is detected as a keypoint, a back apex may not be visible in the 2D image, but the 2D graph layer may be trained to predict the existence of a non-visible back apex of the roof. Once positions and visibility scores for all the keypoints (e.g., 14 keypoints) are determined, the 2D domain positions of the keypoints determined to likely be non-visible may be adjusted based on the 2D domain positions of the keypoints determined to likely be visible, such as according to patterns of visible and non-visible keypoint positions learned during training of the 2D graph layer.

At block 760, the 2D parameters for the model of the substructure may be inputted into a 3D graph layer trained to predict 3D parameters for the substructure in a 3D domain. The 3D parameters may include 3D positions for the keypoints that define a shape of the substructure and an orientation of the substructure. The predicted shape and orientation for the substructure in the 3D domain may be based on patterns learned during training of the 3D graph layer. The shape of the substructure may be determined using a machine-learning model trained to predict shapes for structures based on fixed orientations. The orientation of the substructure may be determined using a machine-learning model trained to predict orientations for structures based on fixed shapes. The training of the shape prediction and orientation prediction may be performed independently and then reconciled or verified with one another.

At block 770, a distance parameter for the substructure may be predicted, such as using a feedforward determination model (e.g., a multilayer perceptron) that is trained to evaluate 2D parameters, such as a set of keypoints and/or a 2D image, to estimate a distance of the physical structure from the camera used to obtain the 2D image. In some examples, the training process may include identifying features in 2D images used for training purposes as having specific known or standard dimensions (e.g., a door height of 80 inches or a wall height of 9 feet). Optionally, the training process may include identifying characteristics for keypoints in the set of keypoints (e.g., distances between keypoints) as having specific known or standard dimensions. The trained feedforward determination model may then recognize patterns associated with features of standard dimensions in the 2D image or in the set of keypoints to estimate distance from the camera in the 2D image to use in generating a 3D At block 780, the 3D model for the substructure may be generated, based on the distance and the 3D parameters of the 3D model, including the predicted shape and the predicted orientation. In some examples, aspects of process 700 may be repeated one or more times for additional substructure of the physical structure. For example, blocks 730-770 may be repeated for additional substructures and block 780 may include predicting a 3D model including each of the different substructures, which may be compiled or assembled into an overall 3D model for the entire physical structure.

Figure 8:
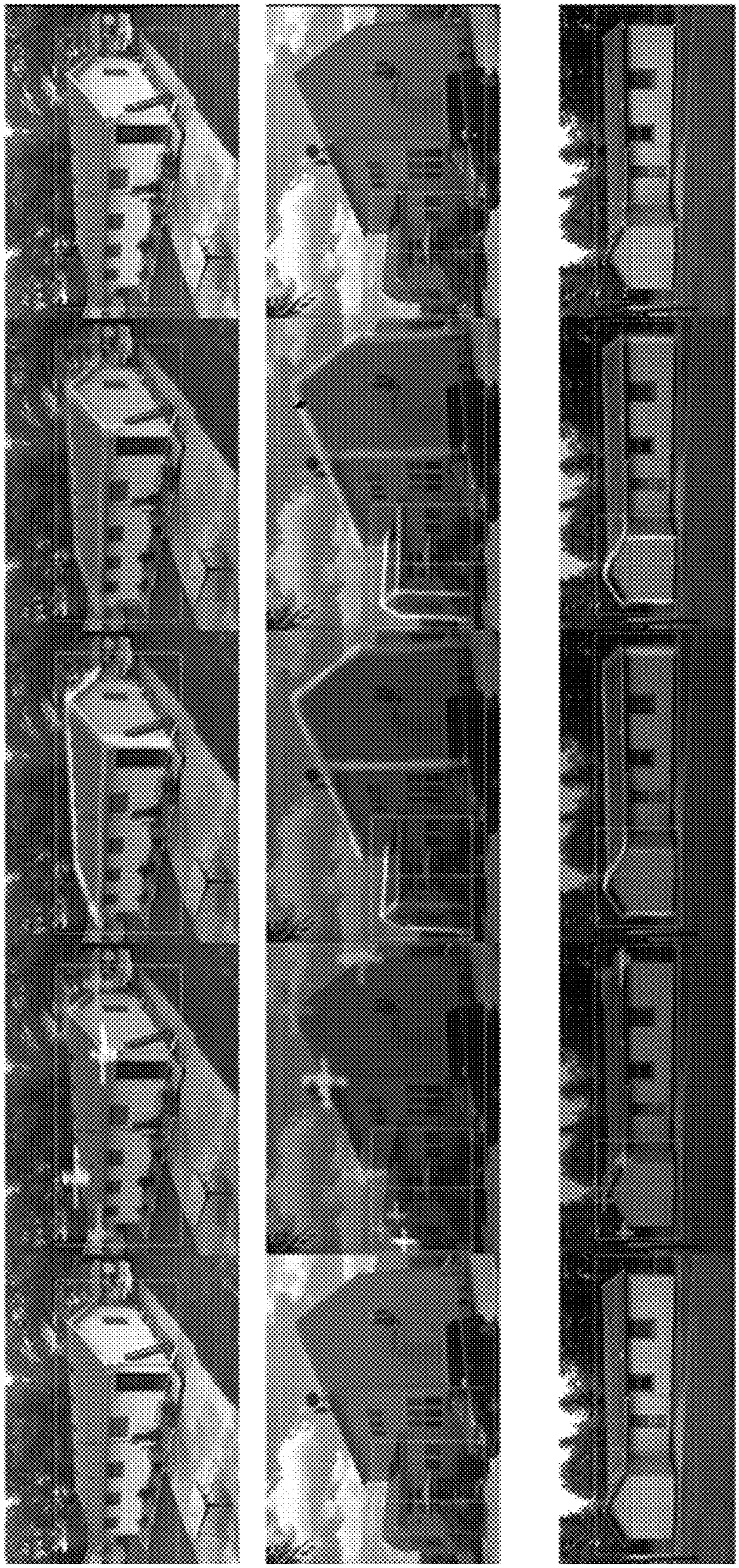
FIG. 8 is a sequence of images illustrating the various masks that are used to classify lines and features within 2D images, according to certain aspects of the present disclosure.

FIG. 8 is a sequence of images 800 illustrating the various masks that are used to classify lines and keypoints or features within 2D images, according to certain aspects of the present disclosure. In some implementations, a solver network may be trained to segment a 2D input image into sets of pixels. For example, each set of segmented pixels may be classified as a structural feature, such as a fascia line or a front apex of a roof. The neural network may be trained to classify the lines and keypoints/features detected within a bounding box of the 2D image.

In some implementations, the solver network may be trained to predict the 3D parameters of a substructure (e.g., a gable) of a physical structure (e.g., a house) based on the classification of keypoints/features or lines detected within pixels of a 2D image of the physical structure. The solver network may include a neural network (e.g., a MaskRCNN) trained to classify lines and/or keypoints/features of a physical structure depicted within pixels of a 2D image. For example, a first neural network may be trained to classify pixels as a fascia line of a roof of a house and a second neural network may be trained to classify pixels as a hip line of the roof of the house, and so on. Alternatively, a single neural network may be trained to classify certain structural lines and keypoints/features. After the lines and keypoints/features of the physical structure have been classified, a substructure, such as a gable, can be detected. For example, a gable can be defined using the classified fascia lines, the classified roof ridgeline, and the classified rake lines. The solver network may parameterize a deformable 3D gable shape (e.g., a known gable primitive in a 3D space) to fit the classified lines that form a gable in the 2D image. Parameterizing the deformable 3D gable shape may include executing a solver protocol to predict the deformation of the deformable 3D gable shape that would fit the classified gable lines. A solver protocol or a 3D graph model may be used to parameterize the deformable 3D gable shape.

To illustrate and only as a non-limiting example, the 2D images shown in FIG. 8 of different houses may be captured using any digital camera. For example, FIG. 8 shows three different 2D input images. Each 2D input image may have captured a view of a house. The 2D image is inputted into an object detection network. The object detection network may include a trained machine-learning model that can simultaneously or successively generate a bounding box surrounding pixels inferred to depict a gable (e.g., substructure) of the house in the 2D image and detect a set of keypoints/features and lines within the bounding box. As an illustrative example, the top images of FIG. 8 show a keypoint/feature representing an eave corner (shown by the white "+" symbol). Further, the top images of FIG. 8 also show structural lines of the roof (shown by a yellow line, for example). The structural lines may be classified using the object detection network. A 2D gable may be inferred based on the presence of an inferred fascia line, an inferred front apex of a roof, and two inferred rake lines.

A validation process for validating that the bounding box contains pixels of the gable may or may not be performed. The keypoints/features associated with the inferred or validated gable may be evaluated in a post-processing step, in which the occluded or invisible keypoints are identified. An invisible keypoint may be a structural intersection of the substructure that is not visible in the 2D image, but that is inferred to exist based on the training of a machine-learning model. The 3D parameters of the 2D gable (e.g., shown in the top image of FIG. 8) may be predicted using the 3D graph model (described above) or using a solver protocol. For example, the solver protocol may be configured to deform a statistically average 3D shape of a gable to fit the 2D gable detected in the top image.

Figure 9:
FIG. 9 is an image of a house for which structural lines of the house have been classified using one or more trained neural networks, according to certain aspects of the present disclosure.
Figure 10:
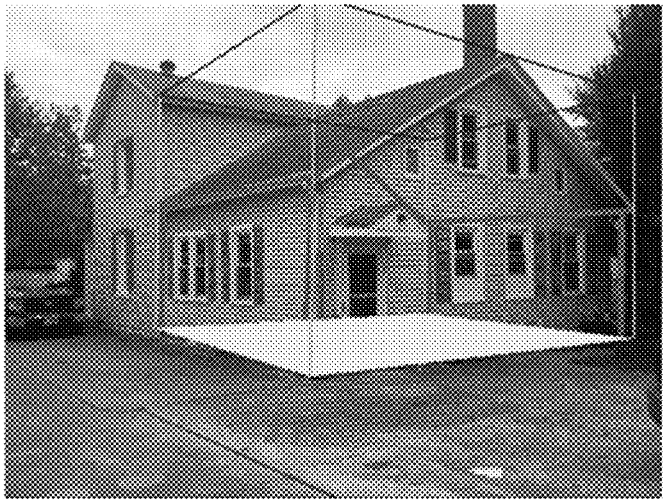
FIG. 10 is an image of a 3D gable fitted onto a detected gable in a 2D image, according to certain aspects of the present disclosure.
Figure 11:
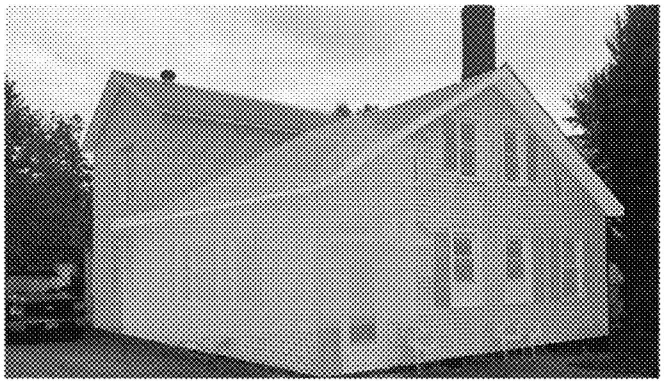
FIG. 11 is an image of a predicted 3D model of a gable depicted in a 2D image, according to certain aspects of the present disclosure.

Continuing with the description of the solver network, FIG. 9 is an image 900 of a house for which points and certain structural lines of the house have been classified using one or more trained neural networks. In some embodiments, the classified points are keypoints, or the classified lines used to generate bounding boxes for detection of structural elements such as gables within a bounding box. FIG. 10 is an image 1000 of a 3D gable fitted onto a detected 2D gable within a bounding box to a portion of house in a 2D image. The 3D gable may be deformed by the solver network to minimize a difference between the projected 3D gable and the 2D gable, such as by applying a deformation function that minimizes the sum of all distances between the keypoints of each respective gable. FIG. 11 is an image 1100 of a 3D model of two different gables depicted in the same 2D image, after such a loss/penalty optimization. The solver network may iteratively perform the steps described with respect to FIG. 8 for each detected gable (or other substructure). While FIGS. 8-11 describe predicting 3D models of 2D gables, the present disclosure is not limited thereto. Other substructures, such as garages, chimneys, doors, and so on, may be inferred in a 2D image by certain classified lines and keypoints. A 3D primitive of the substructure may be deformed using techniques described with respect to FIGS. 8-11 to predict the 3D model of the substructure.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A computer-implemented method, comprising:

generating keypoint visibility predictions for a set of keypoints of a physical structure depicted in a two-dimensional (2D) image in a 2D domain by inputting a feature map of the 2D image into a first trained model;

predicting parameters for a three-dimensional (3D) model of the physical structure by inputting the keypoint visibility predictions into a second trained model;

predicting a distance parameter by inputting the feature map into a third trained model, wherein the distance parameter indicates a distance of the physical structure from an imager that captured the 2D image; and generating, using the parameters for the 3D model of the physical structure and the distance parameter, a prediction of a scaled 3D model of the physical structure depicted in the 2D image.

2. The computer-implemented method of claim 1, wherein the first trained model is a 2D graph model.

3. The computer-implemented method of claim 1, wherein the second trained model is a 3D graph model.

4. The computer-implemented method of claim 1, wherein the third trained model is a feedforward model.

5. The computer-implemented method of claim 1, wherein the set of keypoints represent 2D parameters of the physical structure, and at least one keypoint of the set of keypoints corresponds to a known intersection of structural elements of the physical structure.

6. The computer-implemented method of claim 1, wherein the set of keypoints represent 2D parameters of the physical structure, and at least one keypoint of the set of keypoints is related to a known primitive associated with the physical structure.

7. The computer-implemented method of claim 1, wherein the feature map depicts a semantic segmentation of at least one structural element of the physical structure.

8. The computer-implemented method of claim 1, wherein generating keypoint visibility predictions further comprises:

determining a visibility score for each keypoint of the set of keypoints using the feature map, each visibility score indicating a probability a particular keypoint of the set of keypoints is estimated as occluded or unoccluded; and adjusting 2D positions of occluded keypoints of the set of keypoints based on 2D positions of unoccluded keypoints of the set of keypoints.

9. The computer-implemented method of claim 8, wherein the second trained model maps the unoccluded keypoints and adjusted occluded keypoints in the 2D domain to 3D points in a 3D domain.

10. The computer-implemented method of claim 1, wherein the parameters for the 3D model include a physical structure shape parameter.

11. The computer-implemented method of claim 1, wherein the parameters for the 3D model include a physical structure orientation model.

12. The computer-implemented method of claim 1, wherein predicting the distance parameter comprises using features of the feature map corresponding to objects with standard dimensions.

13. The computer-implemented method of claim 1, wherein predicting the distance parameter comprises using objects in the 2D image with standard dimensions.

14. The computer-implemented method of claim 1, wherein generating a prediction of the scaled 3D model further comprises deforming a statistically average 3D shape to fit the predicted parameters for the 3D model.

15. The computer-implemented method of claim 1, wherein generating a prediction of the scaled 3D model further comprises deforming the predicted parameters for the 3D model to fit one or more geometries in the 2D image.

16. A computer-program product tangibly embodied in a non-transitory machine-readable storage medium and comprising instructions that, when executed by one or more processors, cause the one or more processors to perform operations comprising:

generating keypoint visibility predictions for a set of keypoints of a physical structure depicted in a two-dimensional (2D) image in a 2D domain by inputting a feature map of the 2D image into a first trained model;

predicting parameters for a three-dimensional (3D) model of the physical structure by inputting the keypoint visibility predictions into a second trained model;

predicting a distance parameter by inputting the feature map into a third trained model, wherein the distance parameter indicates a distance of the physical structure from an imager that captured the 2D image; and generating, using the parameters for the 3D model of the physical structure and the distance parameter, a prediction of a scaled 3D model of the physical structure depicted in the 2D image.

17. A system comprising:

one or more processors, and a non-transitory machine-readable storage medium in data communication with the one or more processors, the non-transitory machine-readable storage medium including instructions that, when executed by one or more processors, cause the one or more processors to:

generate keypoint visibility predictions for a set of keypoints of a physical structure depicted in a two-dimensional (2D) image in a 2D domain by inputting a feature map of the 2D image into a first trained model;

predict parameters for a three-dimensional (3D) model of the physical structure by inputting the keypoint visibility predictions into a second trained model;

predict a distance parameter by inputting the feature map into a third trained model, wherein the distance parameter indicates a distance of the physical structure from an imager that captured the 2D image; and generate, using the parameters for the 3D model of the physical structure and the distance parameter, a prediction of a scaled 3D model of the physical structure depicted in the 2D image.

18. The system of claim 17, wherein the first trained model is a 2D graph model.

19. The system of claim 17, wherein the second trained model is a 3D graph model.

20. The system of claim 17, wherein the third trained model is a feedforward model.

21. The system of claim 17, wherein the set of keypoints represent 2D parameters of the physical structure, and at least one keypoint of the set of keypoints corresponds to a known intersection of structural elements of the physical structure.

22. The system of claim 17, wherein the set of keypoints represent 2D parameters of the physical structure, and at least one keypoint of the set of keypoints is related to a known primitive associated with the physical structure.

23. The system of claim 17, wherein the feature map depicts a semantic segmentation of at least one structural element of the physical structure.

24. The system of claim 17, wherein the instructions further cause the one or more processors to generate keypoint visibility predictions by:

determining a visibility score for each keypoint of the set of keypoints using the feature map, each visibility score indicating a probability a particular keypoint of the set of keypoints is estimated as occluded or unoccluded; and adjusting 2D positions of occluded keypoints of the set of keypoints based on 2D positions of unoccluded keypoints of the set of keypoints.

25. The system of claim 24, wherein the second trained model maps the unoccluded keypoints and adjusted occluded keypoints in the 2D domain to 3D points in a 3D domain.

26. The system of claim 17, wherein the parameters for the 3D model include a physical structure shape parameter.

27. The system of claim 17, wherein the parameters for the 3D model include a physical structure orientation model.

28. The system of claim 17, wherein the instructions further cause the one or more processors to predict the distance parameter by using features of the feature map corresponding to objects with standard dimensions.

29. The system of claim 17, wherein the instructions further cause the one or more processors to predict the distance parameter by using objects in the 2D image with standard dimensions.

30. The system of claim 17, wherein the instructions further cause the one or more processors to generate the prediction of the scaled 3D model by deforming a statistically average 3D shape to fit the predicted parameters for the 3D model.

31. The system of claim 17, wherein the instructions further cause the one or more processors to generate the prediction of the scaled 3D model by deforming the predicted parameters for the 3D model to fit one or more geometries in the 2D image.

* * * * *